(12) United States Patent
Sasaki et al.

(10) Patent No.: US 10,701,286 B2
(45) Date of Patent: Jun. 30, 2020

(54) IMAGE PROCESSING DEVICE, IMAGE PROCESSING SYSTEM, AND NON-TRANSITORY STORAGE MEDIUM

(71) Applicants: Tomohiko Sasaki, Tokyo (JP); Hitomi Mizutani, Kanagawa (JP); Ayumu Wakabayashi, Kanagawa (JP)

(72) Inventors: Tomohiko Sasaki, Tokyo (JP); Hitomi Mizutani, Kanagawa (JP); Ayumu Wakabayashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 25 days.

(21) Appl. No.: 16/106,417

(22) Filed: Aug. 21, 2018

(65) Prior Publication Data
US 2018/0359430 A1 Dec. 13, 2018

Related U.S. Application Data

(63) Continuation of application No. PCT/JP2016/085630, filed on Nov. 30, 2016.

(30) Foreign Application Priority Data

Feb. 24, 2016 (JP) .................... 2016-033642

(51) Int. Cl.
*H04N 5/272* (2006.01)
*H04N 5/262* (2006.01)
(Continued)

(52) U.S. Cl.
CPC ........... *H04N 5/272* (2013.01); *G06T 3/0062* (2013.01); *G06T 3/4038* (2013.01); *G06T 11/60* (2013.01);
(Continued)

(58) Field of Classification Search
CPC .. H04N 5/272; H04N 5/2628; H04N 5/23238; H04N 5/23229; H04N 5/235;
(Continued)

(56) References Cited

U.S. PATENT DOCUMENTS 9,646,404 B2    5/2017  Irie et al.
9,756,242 B2    9/2017  Harada et al.
(Continued)

FOREIGN PATENT DOCUMENTS

JP    2006-060424    3/2006
JP    2007-011543    1/2007
(Continued)

OTHER PUBLICATIONS

Wang P et al: "An image-based texture mapping technique for apparel products exhibition and interior design", Displays Devi, Dempapublications, Tokyo, JP, vol. 24, No. 4-5, Dec. 1, 2003 (Dec. 1, 2003), pp. 179-186, XP004499789, ISSN: 0141-9382, DOI:10.1016/J.DISPLA.2004.01.004.
(Continued)

*Primary Examiner* — Marly S Camargo
(74) *Attorney, Agent, or Firm* — IPUSA, PLLC

(57) ABSTRACT

An image processing device includes an input unit configured to input a first image; a selector configured to select a second image added to the first image; a converter configured to generate a converted image by converting the second image based on the first image; and a synthesizer configured to generate a synthesized image by synthesizing the first image and the converted image.

10 Claims, 31 Drawing Sheets

(51) Int. Cl.
*H04N 5/232* (2006.01)
*H04N 5/235* (2006.01)
*G06T 3/00* (2006.01)
*G06T 3/40* (2006.01)
*G06T 5/50* (2006.01)
*G06T 11/60* (2006.01)

(52) U.S. Cl.
CPC ....... *H04N 5/23238* (2013.01); *H04N 5/2628* (2013.01)

(58) Field of Classification Search
CPC ... G06T 3/0062; G06T 3/4038; G06T 3/4084; G06T 5/50; G06T 5/265; G06T 11/60
USPC ............. 348/218.1, 601, 37, 239, 668, 597; 382/309, 175, 184, 287; 345/601, 419, 345/629, 630, 633, 634; 715/255, 206, 715/241, 723
See application file for complete search history.

(56) References Cited

U.S. PATENT DOCUMENTS

| | | | |
|---|---|---|---|
| 9,760,974 B2 | 9/2017 | Irie et al. | |
| 2007/0217780 A1* | 9/2007 | Hirooka | G03B 17/18 396/287 |
| 2009/0160996 A1* | 6/2009 | Yamaoka | H04N 5/222 348/333.11 |
| 2012/0146991 A1 | 6/2012 | Bala et al. | |
| 2012/0223968 A1 | 9/2012 | Kashimoto | |
| 2013/0113789 A1 | 5/2013 | Suzuki | |
| 2013/0162681 A1 | 6/2013 | Peterson | |
| 2013/0326419 A1* | 12/2013 | Harada | G06F 3/04817 715/838 |
| 2014/0173471 A1 | 6/2014 | Maenpaa | |
| 2014/0267816 A1* | 9/2014 | Baek | H04N 5/23229 348/218.1 |
| 2017/0337658 A1 | 11/2017 | Irie et al. | |
| 2018/0070023 A1* | 3/2018 | Oh | H04N 5/2625 348/239 |
| 2019/0306201 A1* | 10/2019 | Ohmura | H04L 65/403 358/471 |
| 2020/0051265 A1* | 2/2020 | Kim | G06T 7/55 382/276 |

FOREIGN PATENT DOCUMENTS

| | | |
|---|---|---|
| JP | 2013-101529 | 5/2013 |
| JP | 2013-109469 | 6/2013 |
| JP | 2014-006880 | 1/2014 |
| JP | 2014-030104 | 2/2014 |
| JP | 2015-018013 | 1/2015 |

OTHER PUBLICATIONS

Extended European Search Report for 16891639.3 dated Feb. 13, 2019.
Korean Office Action for 10-2018-7023942 dated Aug. 20, 2019.
International Search Report dated Jan. 31, 2017 in PCT/JP2016/085630 filed on Nov. 30, 2016.

* cited by examiner

FIG.20

| RANGE | OUTPUT MAGNIFICATION | ZOOM SPECIFIED VALUE ZP | ANGLE OF VIEW ω | PARAMETERS TO BE CHANGED | | REMARKS |
|---|---|---|---|---|---|---|
| A~B | | 60~120 ω=ZP | 60°~120° | d=0~1 | d=ω/60−1 | MOVEMENT WITHIN SPHERE FIXED AT VIEWING ANGLE α=60° |
| B~C | viewWH/imgWH*imageDeg/ω | 120~240 ω=ZP | 120°~240° | α=60~120 | α=ω/2 | FIXED WITH MOVEMENT AMOUNT d=1 |
| C~D | | 240~268.5 ω≠ZP | 240°~300° | d=1~dmax1 | d=1+(dmax2−1)*(ZP−240)/120 | FFIXED AT VIEWING ANGLE α=120° THE MAXIMUM DISPLAY DISTANCE dmax1 IS BASED ON THE SIZE OF THE OUTPUT AREA |
| D~E | viewWH/imgWH*360/ω *tan(asin(1/d)/tan(α/2)) | 268.5~300 ω≠ZP | 300°~278° | d=dmax1 ~dmax2 | d=1+(dmax2−1)*(ZP−240)/120 | FFIXED AT VIEWING ANGLE α=120° THE LIMIT DISPLAY DISTANCE dmax2 IS BASED ON THE SIZE OF THE OUTPUT AREA |

FIG.21
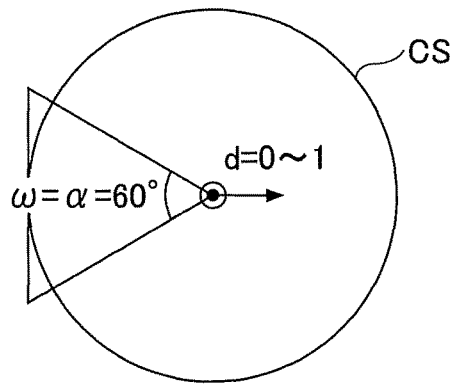
FIG.22
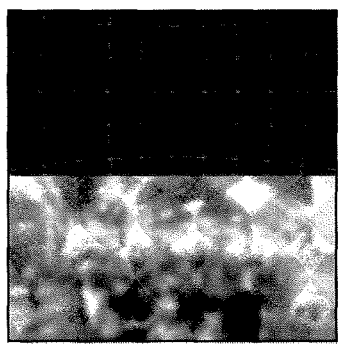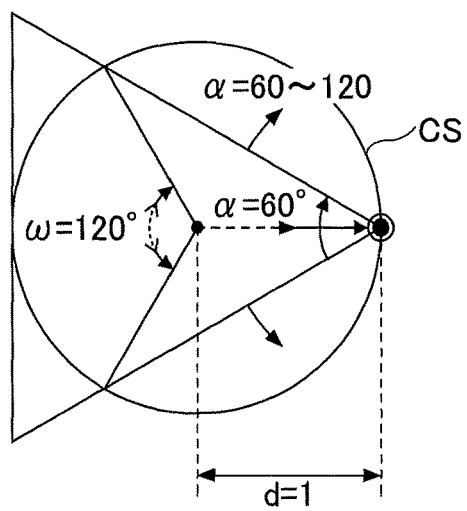
FIG.23
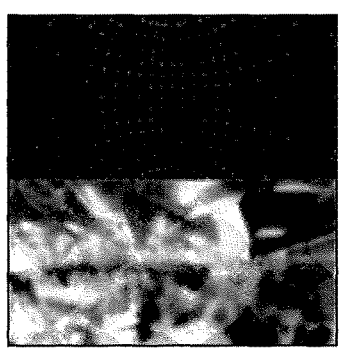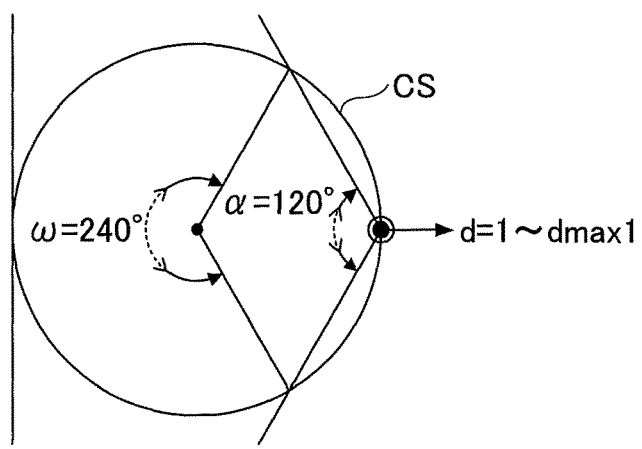

FIG.24
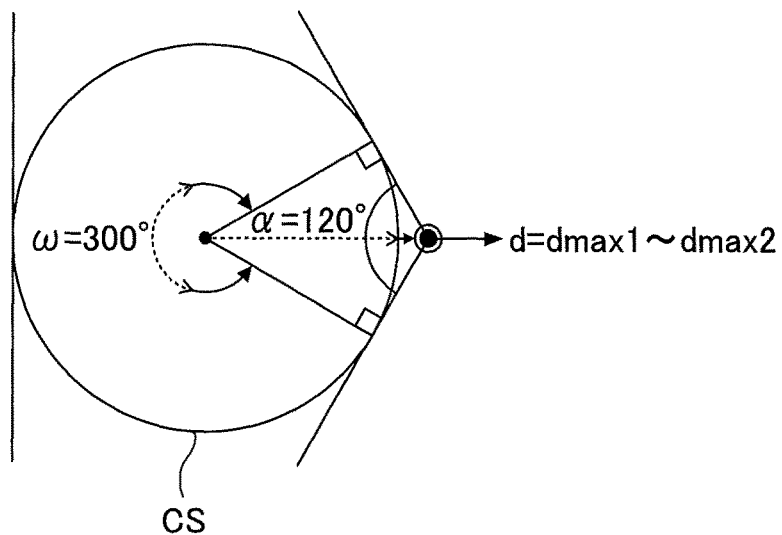
FIG.25
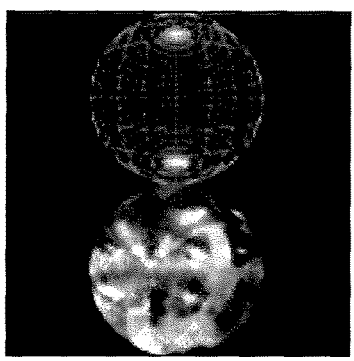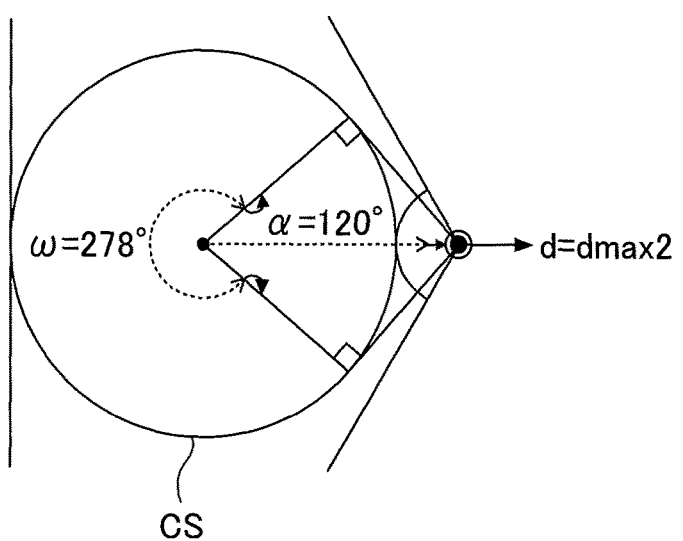

IMAGE PROCESSING DEVICE, IMAGE PROCESSING SYSTEM, AND NON-TRANSITORY STORAGE MEDIUM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/085630 filed on Nov. 30, 2016 and designating the U.S., which claims priority to Japanese Patent Application No. 2016-033642 filed on Feb. 24, 2016. The entire contents of the foregoing applications are incorporated herein by reference.

BACKGROUND OF THE INVENTION

1. Field of the Invention

The present disclosure relates to an image processing device, an image processing system, and a non-transitory storage medium storing a program.

2. Description of the Related Art

A method of displaying a panoramic image has been known, conventionally. In addition, a user interface (which is referred to as "UI," hereinafter) has been known that is for receiving, in the display of the panoramic image, a user's indication of the display of the panoramic image.

For example, by displaying, by a communication terminal, thumbnails related to predetermined region images of a panoramic image, and by receiving, by the communication terminal, an indication to select a predetermined thumbnail, the communication terminal displays a predetermined region image related to the received thumbnail. A method has been known such that a user can easily search for, in this manner, a predetermined region image desired by the user in a panoramic image desired by the user or in a panoramic image (Patent Document 1 (Japanese Unexamined Patent Publication No. 2014-6880), for example).

Likewise, first, a computer generates, from an image, a partial image, which is a partial region of the image and which includes a viewpoint on the image at the center, and displays the image and a viewpoint list image that indicates a list of thumbnails of a plurality of partial images. Next, the computer receives, from a server apparatus, comment information obtained by associating a partial image with a user's comment on the partial image, and displays a number of comments for each thumbnail of a partial image indicated in the viewpoint list image. A method has been known with which a user can find, in this manner, a viewpoint in an image with a high attention level (Patent Document 2 (Japanese Unexamined Patent Publication No. 2015-18013), for example).

Additionally, when a user attempts to download image data from an image management system using a receiver, the receiver downloads, based on corresponding image identification information, additional information from an additional information management system. A method has been known with which a user can use, in this manner, metadata for performing image processing, such as correcting image data (Patent Document 3 (Japanese Unexamined Patent Publication No. 2014-30104), for example).

According to a known method, when an image is newly added to a captured image, the image becomes unnatural, and awkward images are often generated.

There is a need for an image processing device capable of generating less awkward images, even if an image is newly added to a captured image.

SUMMARY OF THE INVENTION

According to an aspect of the present disclosure, there is provided an image processing device including an input unit configured to input a first image; a selector configured to select a second image added to the first image; a converter configured to generate a converted image by converting the second image based on the first image; and a synthesizer configured to generate a synthesized image by synthesizing the first image and the converted image.

According to the disclosed technology, an image processing device can be provided that is capable of generating a less awkward image, even if an image is newly added to a captured image.

BRIEF DESCRIPTION OF THE DRAWINGS

FIG. 20 shows a table illustrating the example of the other zooming process according to an embodiment of the present disclosure;

FIG. 21 is a diagram (version 1) illustrating an example of a range of the other zooming process according to an embodiment of the present disclosure;

FIG. 22 is a diagram (version 2) illustrating the example of the range of the other zooming process according to an embodiment of the present disclosure;

FIG. 23 is a diagram (version 3) illustrating the example of the range of the other zooming process according to an embodiment of the present disclosure;

FIG. 24 is a diagram (version 4) illustrating the example of the range of the other zooming process according to an embodiment of the present disclosure;

FIG. 25 is a diagram (version 5) illustrating the example of the range of the other zooming process according to an embodiment of the present disclosure;

DESCRIPTION OF THE PREFERRED EMBODIMENTS

An embodiment of the present disclosure is described below.

Example of Overall Configuration of the Image Processing System

Figure 1:
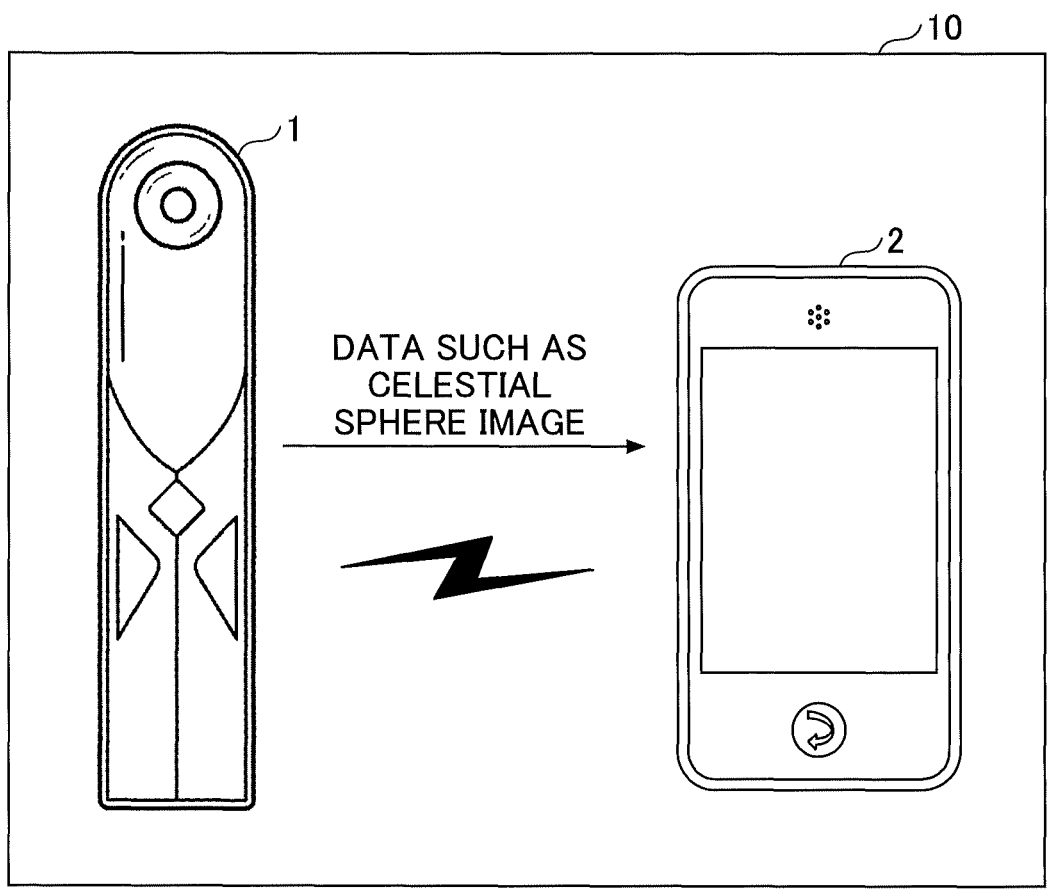
FIG. 1 is a diagram illustrating an example of an overall configuration of an image processing system according to an embodiment of the present disclosure.

FIG. 1 is a diagram illustrating an example of an overall configuration of an image processing system according to an embodiment of the present disclosure. In the depicted example, the image processing system 10 includes an image capturing device 1; and a smartphone 2, which is an example of an image processing device.

The image capturing device 1 is a camera including a plurality of optical systems. For example, the image capturing device 1 generates an image indicating a wide range (which is referred to as "celestial sphere image," hereinafter), such as all directions, based on images captured using the plurality of optical systems. Next, the image capturing unit 1 outputs the celestial sphere image to the smartphone 2. Then, the smartphone 2 performs image processing on the input image, such as the celestial sphere image. In the following, an example is described in which the input image, namely, a first image is a celestial sphere image. Note that, in the following description, a panoramic image is, for example, the celestial sphere image.

Further, in this example, the image capturing device 1 and the smartphone 2 are wired or wirelessly connected. For example, the smartphone 2 downloads, from the image capturing device 1, data indicating a celestial sphere image output by the image capturing device 1. Note that the connection may be established through a network.

Here, the overall configuration is not limited to the depicted configuration. For example, the image capturing device 1 and the smartphone 2 may be an integrated device. The image processing device 10 may further include, in addition to the image capturing device 1 and the smartphone 2, an image processing device.

Example of the Image Capturing Device

The image capturing device 1 (FIG. 1) is, for example, a device, such as that described below.

Figure 2:
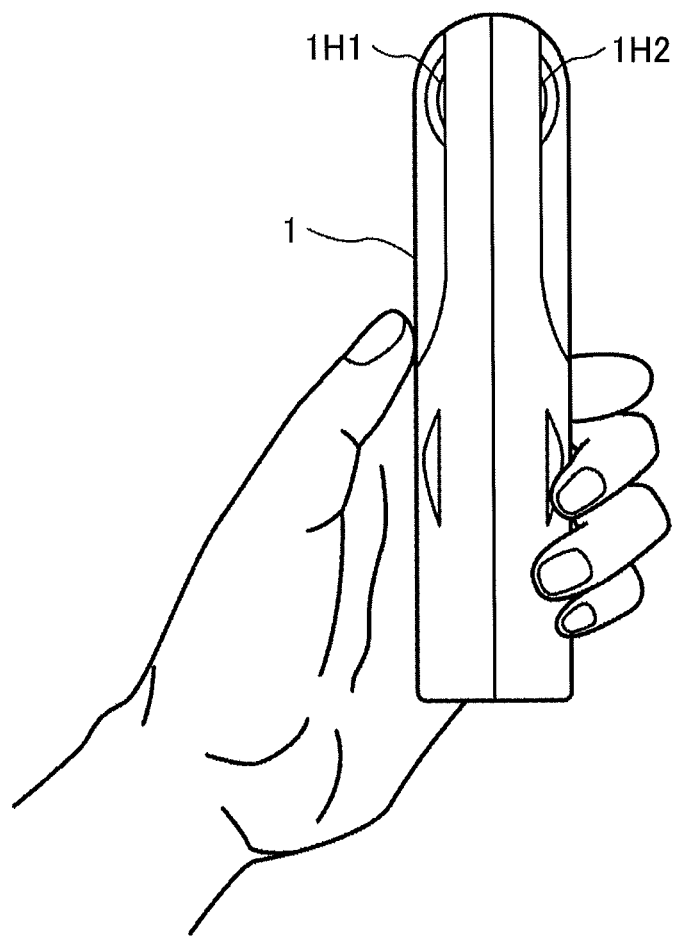
FIG. 2 is a diagram (version 1) illustrating an example of an image capturing device according to an embodiment of the present disclosure.
Figure 3:
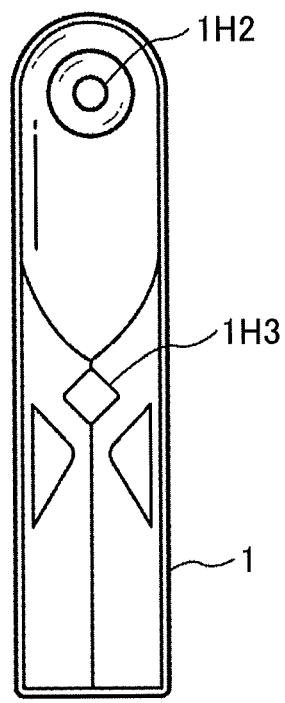
FIG. 3 is a diagram (version 2) illustrating the example of the image capturing device according to an embodiment of the present disclosure.
Figure 4:
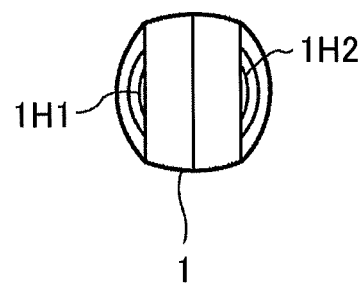
FIG. 4 is a diagram (version 3) illustrating the example of the image capturing device according to an embodiment of the present disclosure.

FIG. 2 through FIG. 4 are diagrams illustrating an example of the image capturing device according to the embodiment of the present disclosure. FIG. 2 through FIG. 4 are diagrams illustrating an example of an appearance of the image capturing device 1. Specifically, FIG. 2 is an example of a front view of the image capturing device 1. FIG. 3 is an example of a left side view of the image capturing device 1. FIG. 4 is an example of a plan view of the image capturing device 1.

The image capturing device 1 is provided with a front image sensor 1H1; a backward image sensor 1H2; and a switch 1H3. In this example, one or more optical systems, such as the front image sensor 1H1 and the backward image sensor 1H2, are used for image capturing; and the image capturing device 1 generates a celestial sphere image based on images captured using the respective optical systems. The details of the method of generating the celestial 15, sphere image are described below.

The switch 1H3 is a shutter button, and the switch 1H3 is an example of an input device for a user to indicate the image capturing device 1 to capture an image.

For example, as illustrated in FIG. 2, when the image capturing device 1 is held by a user's hand and the switch 1H3 is pressed by the user, the image capturing device 1 captures an image. Specifically, the image capturing device 1 is used for image capturing as described below.

Figure 5:
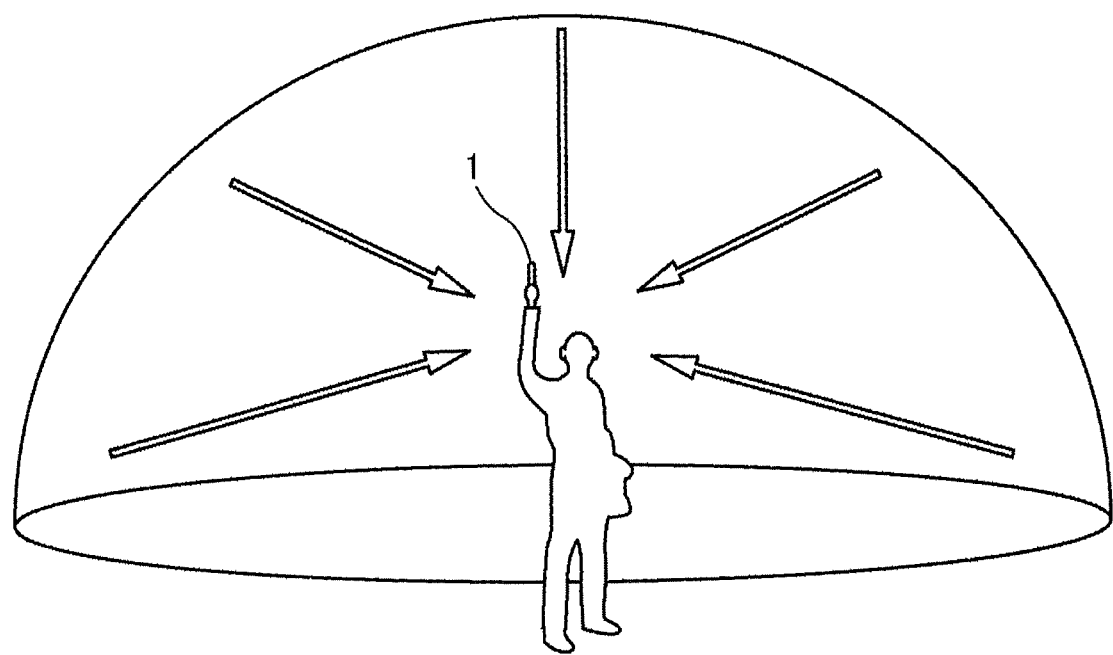
FIG. 5 is a diagram illustrating an example of image capturing by the image capturing device according to an embodiment of the present disclosure.

FIG. 5 is a diagram illustrating an example of image capturing by the image capturing device according to the embodiment of the present disclosure. As depicted, a user holes the image capturing device 1 by a hand, and the user presses the switch 1H3, which is illustrated in FIG. 3, to capture an image. In this manner, as depicted, the image capturing device 1 can capture an image in all directions of the image capturing device 1 by the front image sensor 1H1 (FIG. 2) and the backward image sensor 1H2 (FIG. 2). The image captured in this manner may be, for example, the following image.

Figure 6:
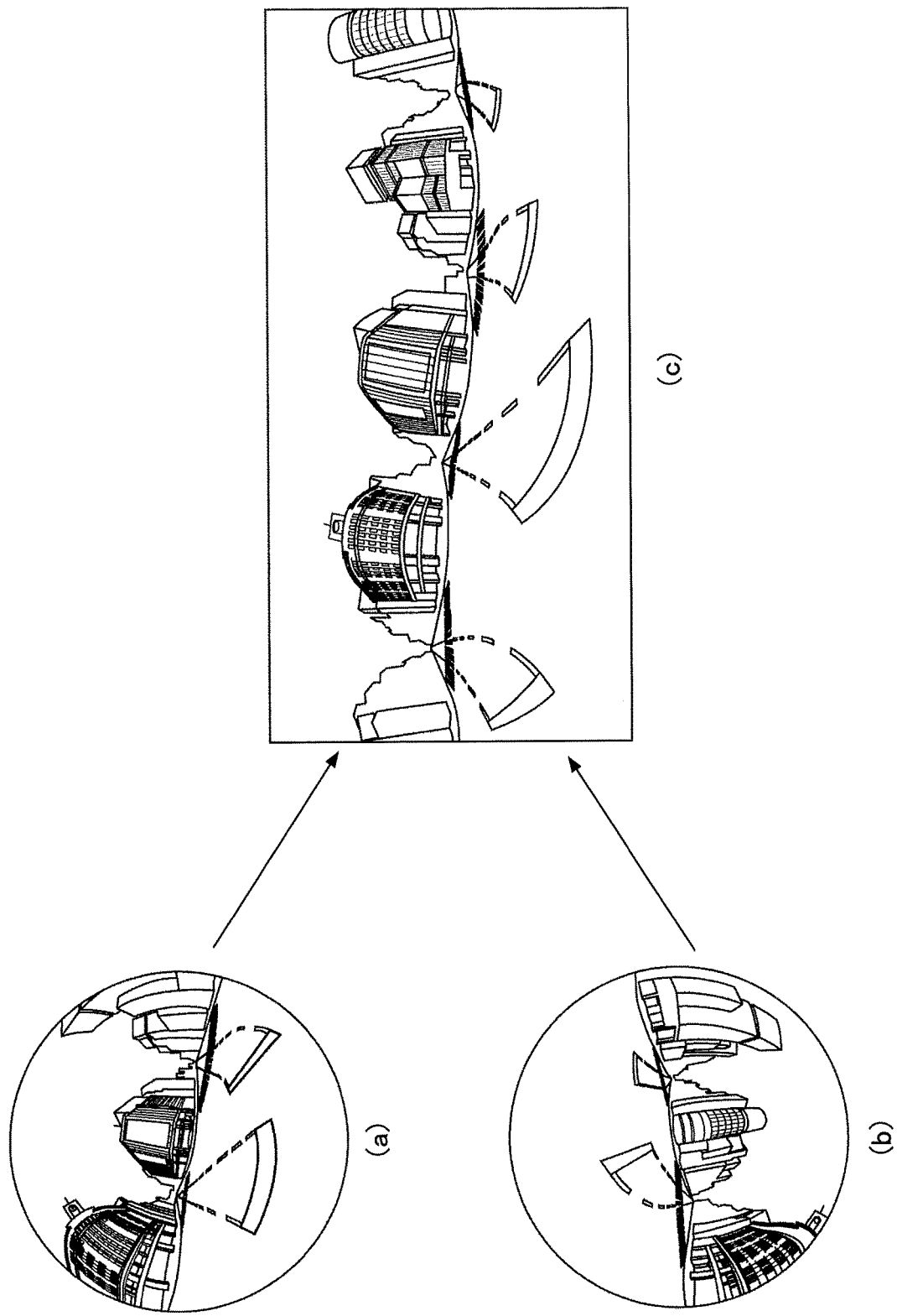
FIG. 6 is a diagram illustrating an example of an image captured by the image capturing device according to an embodiment of the present disclosure.

FIG. 6 is a diagram illustrating an example of the image captured by the image capturing device according to the embodiment of the present disclosure. Specifically, (a) of FIG. 6 is an example of the image captured by the front image sensor 1H1 (FIG. 2). In FIG. 6, (b) is an example of the image captured by the backward image sensor 1H2 (FIG. 2). In FIG. 6, (c) is an example of an image generated based on the image captured by the front image sensor 1H1, i.e., the image of (a) of FIG. 6, and the image captured by the backward image sensor 1H2, i.e., the image illustrated in (b) of FIG. 6.

As illustrated in (a) of FIG. 6, the image captured by the front image sensor 1H1 is an image of a coverage that is a wide range in front of the image capturing device 1, such as a range corresponding to a view angle of 180°. As depicted, when an optical system for capturing a wide range image is used for the front image sensor 1H1, for example, when a fisheye lens is used, the image captured by the front image sensor 1H1 has distortion aberration. Namely, the image illustrated in (a) of FIG. 6 is a hemisphere image (which is referred to as the hemisphere image, hereinafter) that represents a wide range of one side of the image capturing device 1, and that has distortion aberration.

Here, a view angle of each of the optical systems is preferably in a range that is greater than or equal to 180° and less than or equal to 200°. In particular, if the view angle is greater than or equal to 180°, there is an image area to be superimposed for synthesizing the hemisphere image illustrated in (a) of FIG. 6 and the hemisphere image illustrated in (b) of FIG. 6. Thus, the image capturing device is facilitated to create a celestial sphere image.

As illustrated in (b) of FIG. 6, the image captured by the backward image sensor 1H2 is an image of a coverage that is a wide range on the rear side of the image capturing device 1, such as a range corresponding to a view angle of 180°. As described, the image captured by the backward image sensor 1H2 is a hemisphere image, similar to that of (a) in FIG. 6.

Next, the image capturing device 1 executes processing, such as distortion correction processing and synthesis processing, and the image capturing device 1 generates the image illustrated in (c) of FIG. 6, based on the hemisphere image on the front side illustrated in (a) of FIG. 6, and the hemisphere image on the rear side illustrated in (b) of FIG. 6. Namely, the image illustrated in (c) of FIG. 6 is an image generated by a Mercator projection method or an equidistance cylindrical projection method, namely, an example of a celestial sphere image.

Here, the first image is not limited to the image generated by the image capturing device 1. For example, the first image may be an image captured by another camera, or an image generated based on an image captured by another camera. Note that the first image is preferably an image obtained by capturing a wide view angle range by an omnidirectional camera or a camera with a wide angle lens, such as that of illustrated in FIG. 6.

In the following description, an example is described in which the first image is a celestial sphere image. However, the first image is not limited to the celestial sphere image. For example, the first image may be an image captured by a compact camera, a single lens reflex camera, or a smartphone. The image may be a panoramic image that extends horizontally or vertically.

Example of Hardware Configuration of the Image Capturing Device

Figure 7:
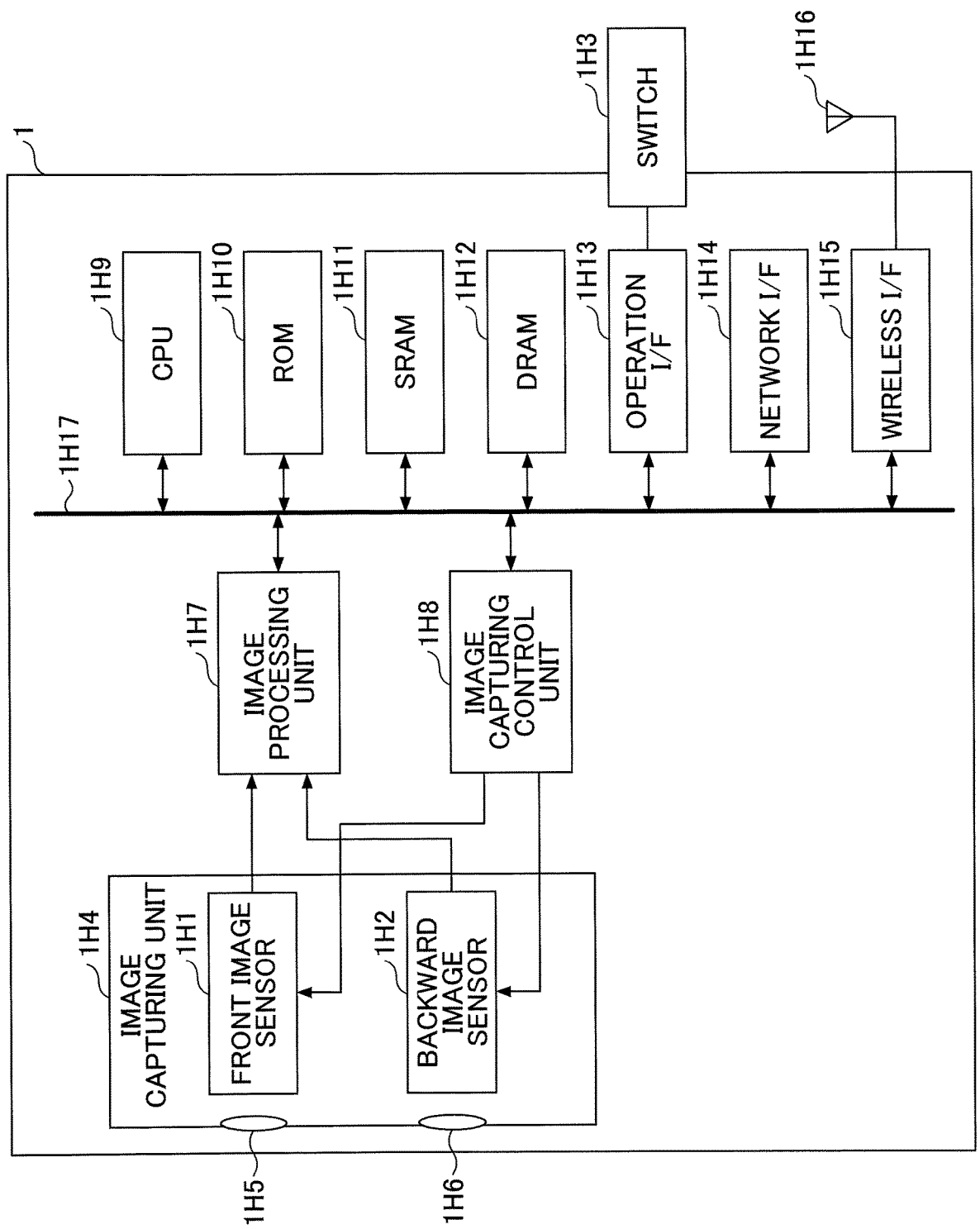
FIG. 7 is a block diagram illustrating an example of a hardware configuration of the image capturing device according to an embodiment of the present disclosure.

FIG. 7 is a block diagram illustrating an example of a hardware configuration of the image capturing device according to the embodiment of the present disclosure. As depicted, the image capturing device 1 includes an image capturing unit 1H4; an image processing unit 1H7; an image capturing control unit 1H8; a CPU (Central Processing Unit) 1H9; and a ROM (Read-Only Memory) 1H10. Further, the image capturing device 1 includes a SRAM (Static Random Access Memory) 1H11; a DRAM (Dynamic Random Access Memory) 1H12; and an operation I/F (interface) 1H13. Furthermore, the image capturing device 1 includes a network I/F 1H14; a wireless I/F 1H15; and an antenna 1H16. The hardware components included in the image capturing device 1 are connected by a bus 1H17, and data or signals are input and output through the bus 1H17.

The image capturing unit 1H4 includes the front image sensor 1H1 and the backward image sensor 1H2. Furthermore, a lens 1H5 corresponding to the front image sensor 1H1 and a lens 1H6 corresponding to the backward image sensor 1H2 are installed.

The front image sensor 1H1 and the backward image sensor 1H2 are camera units. Specifically, each of the front image sensor 1H1 and the backward image sensor 1H2 includes an optical sensor, such as a COMS (Complementary Metal Oxide Semiconductor) or a CCD (Charge Coupled Device). The front image sensor 1H1 converts light entering through the lens 1H5, and generates image data indicating a hemisphere image. Similarly, the backward image sensor 1H2 coverts light entering through the lens 1H6, and generates image data indicating a hemisphere image.

Subsequently, the image capturing unit 1H4 outputs, to the image processing unit 1H7, the image data generated by the front image sensor 1H1 and the image data generated by the backward image sensor 1H2. For example, the output image data is the front hemisphere image illustrated in (a) of FIG. 6, and the other output image data is the rear hemisphere image illustrated in (b) of FIG. 6.

Furthermore, in order to capture a high quality image, each of the front image sensor 1H1 and the backward image sensor 1H2 may further include, in addition to the lens, another optical element, such as a diaphragm or a low-pass filter. Additionally, in order to capture a high quality image, each of the front image sensor 1H1 and the backward image sensor 1H2 may perform defect pixel correction or image stabilization.

The image processing unit 1H7 generates the celestial sphere image illustrated in (c) of FIG. 6 based on the image data input form the image capturing unit 1H4. The image processing unit 1H7 generates the celestial sphere image illustrated in (c) of FIG. 6 based on the image data input form the image capturing unit 1H4. The image processing unit 1H7 generates the celestial sphere image illustrated in (c) of FIG. 6 based on the image data input form the image capturing unit 1H4.

The image capturing control unit 1H8 is a control device that controls the hardware of the image capturing device 1.

The CPU 1H9 is a processor that executes processing and data processing for implementing each process, and the CPU 1H9 is a control device that executes control of the hardware. For example, the CPU 1H9 executes each process based on a program installed in advance.

The ROM 1H10, the SRAM 1H11, and the DRAM 1H12 are examples of a storage device. Specifically, the ROM 1H10 stores, for example, a program, data, or a parameter for the CPU 1H9 to execute a process. The SRAM 1H11 and the DRAM 1H12 store, for example, a program that is used for executing a process by the CPU 1H9 based on another program, data used by the program, and data generated by the program. Here, the image capturing device 1 may further include an auxiliary storage device, such as a hard disk.

The operation I/F 1H13 is connected to an input device, such as the switch 1H3, and the operation I/F 1H13 is an interface for executing a process of inputting a user's operation to the image capturing device 1. For example, the operation I/F 1H13 is an input device, such as a switch; a connector for connecting the input device; a cable; a circuit for processing a signal input from the input device; a driver; and a controller. The operation I/F 1H13 may further include an output device, such as a display. The operation I/F H13 may be a touch panel in which the input device and the output device are integrated. The operation I/F H13 may further include an interface, such as a USB (Universal Serial Bus), and the operation I/F H13 may connect a recording medium, such as a flash memory, to the image capturing device 1. As a result, the operation I/F 1H13 may input data to the recording medium from the image capturing device 1, and may output data from the recording medium to the image capturing device 1.

The switch 1H3 may be a power switch and a parameter input switch for executing an operation other than the operation related to the shutter.

The network I/F 1H14, the wireless I/F H15, and the antenna 1H16 connect an external device to the image capturing device 1 wirelessly or through wire. For example, the image capturing device 1 connects to the network through the network I/F 1H14, and the image capturing device 1 transmits data to the smartphone (FIG. 1). Here, each of the network I/F 1H14, the wireless I/F 1H15, and the antenna 1H16 may be hardware for connecting to another external device with wire, such as the USB. Namely, each of the network I/F 1H14, the wireless I/F 1H15, and the antenna 1H16 may be a connector and a cable.

The bus 1H17 is used for inputting and outputting data among hardware components of the image capturing device 1. Namely, the bus 1H17 is an internal bus. Specifically, the bus 1H17 is, for example, PCI Express (Peripheral Component Interconnect Bus Express).

The image capturing device is not limited to the case where two image sensors are included. For example, three or more image sensors may be included. Furthermore, the image capturing device 1 may capture a plurality of partial images by changing the image capturing angle of a single image sensor. Furthermore, the image capturing device 1 is not limited to the optical system using the fish-eye lens. For example, a wide-angle lens may be used.

The process executed by the image capturing device 1 may be executed by another device. For example, some or all the process may be executed by the smartphone 2 or by another information processing device connected to the network, by transmitting data and a parameter by the image capturing device 1. As described above, the image processing system may include a plurality of information processing devices and the image processing system may execute a process in a distributed manner, a redundant manner, or a parallel manner.

Example of Hardware Configuration of the Information Processing Device

Figure 8:
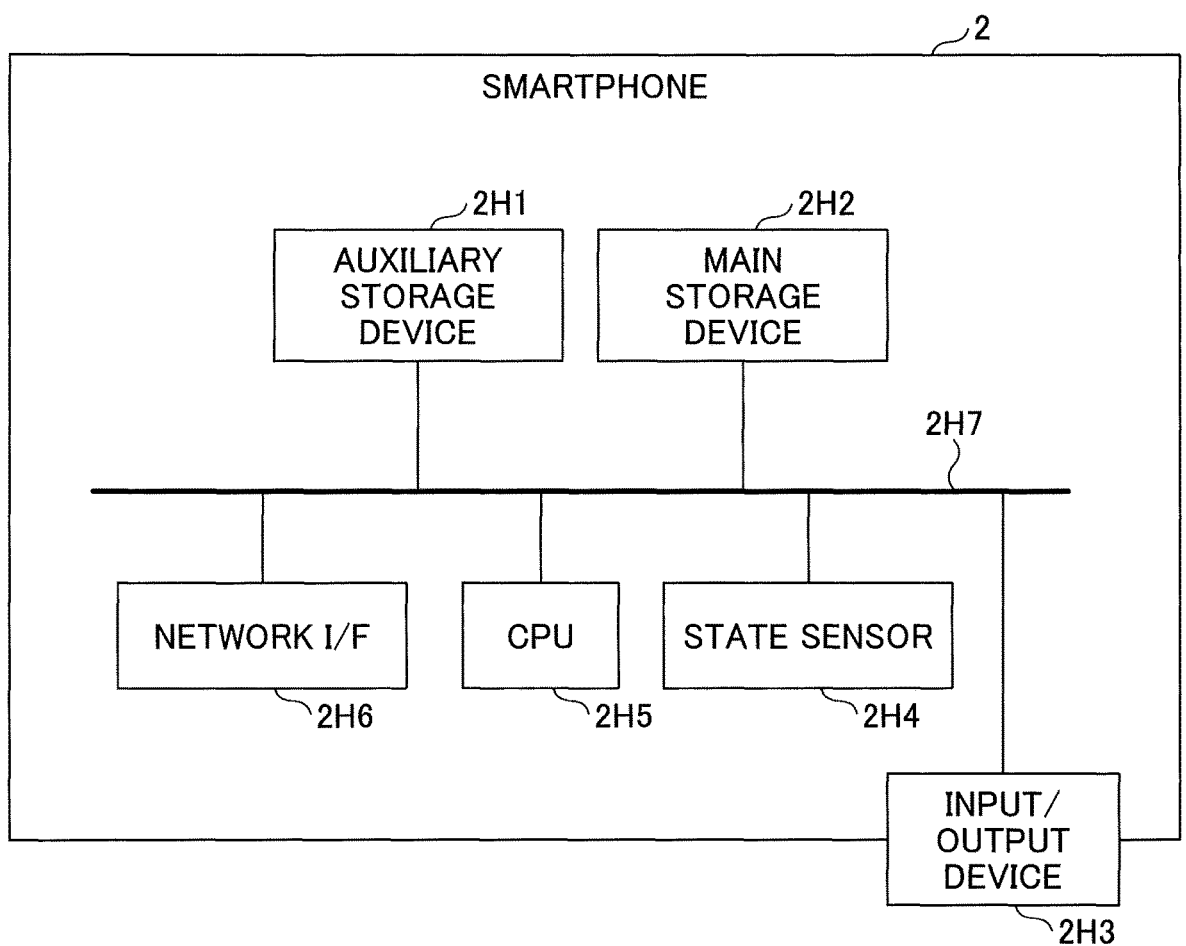
FIG. 8 is a block diagram illustrating an example of a hardware configuration of a smartphone according to an embodiment of the present disclosure.

FIG. 8 is a block diagram illustrating an example of a hardware configuration of the smartphone according to the embodiment of the present disclosure. As depicted, the smartphone 2, which is an example of the information processing device, includes an auxiliary storage device 2H1; a main storage device 2H2; an input/output device 2H3; a state sensor 2H4; a CPU 2H5; and a network I/F 2H6. Further, the hardware components included in the smartphone 2 are connected by a bus 2H7, and data or signals are input and output through the bus 2H7.

The auxiliary storage device 2H1 stores data, a parameter, or a program. Specifically, the auxiliary storage device 2H1 is, for example, a hard disk, or a flush SSD (Solid State Drive). A part or entire data stored in the auxiliary storage device 2H1 may be redundantly or alternatively stored in a file server connected by the network I/F 2H6.

The main storage device 2H2 is a memory (Memory), which is a storage area used by a program for executing a process. Namely, the main storage device 2H2 stores data, a program, or a parameter. Specifically, the main storage device 2H2 is, for example, a SRAM (Static Random Access Memory) or a DRAM. The main storage device 2H2 may further include a control device that performs storage and retrieval.

The input/output device 2H3 is an output device for displaying an image or a processing result, and an input device for inputting a user's operation. Specifically, the input/output device 2H3 is a touch panel, a peripheral circuit, and a driver. For example, the input/output device 2H3 displays, to the user, a predetermined GUI (Graphic User Interface) and an image to which image processing is applied. For example, when a user operates a displayed GUI or an image, the input/output device 2H3 input the user's operation.

The state sensor 2H4 is a sensor for detecting a state of the smartphone 2. Specifically, the state sensor 2H4 is a gyro sensor or an angle sensor. For example, the state sensor 2H4 determines whether an angle of a side among sides of the smartphone 2 is greater than or equal to a predetermined angle with respect to the horizontal. Namely, the state sensor 2H4 detects whether the smartphone 2 is in the vertical posture state or the lateral posture state.

The CPU 2H5 is a processor for executing processing or data processing for implementing each process, and the CPU 2H5 is a control device for controlling hardware. In order to execute a process in a parallel manner, a redundant manner, or a distributed manner, the CPU 2H5 may be formed of a plurality of CPUs, devices, or a plurality of cores. The smartphone 2 may further include, internally or externally, a GPU (Graphics Processing Unit) for executing image processing.

The network I/F 2H6 connects to an external device through a network wirelessly or through wire. Specifically, the network I/F 2H6 is an antenna, a peripheral circuit, and a driver for inputting and outputting data. For example, the smartphone 2 inputs image data from the image capturing device 1 (FIG. 1) by the CPU 2H5 and the network I/F 2H6. The smartphone 2 outputs data to the image capturing device 1 by the CPU 2H5 and the network I/F 2H6.

The information processing device is not limited to the smartphone. Namely, the information processing device may be a computer other than the smartphone. For example, the information processing device may be a PC (Personal Computer), a PDA (Personal Digital Assistance), a tablet, a cellular phone, or a combination thereof.

Example of Overall Processing by the Image Processing System

Figure 9:
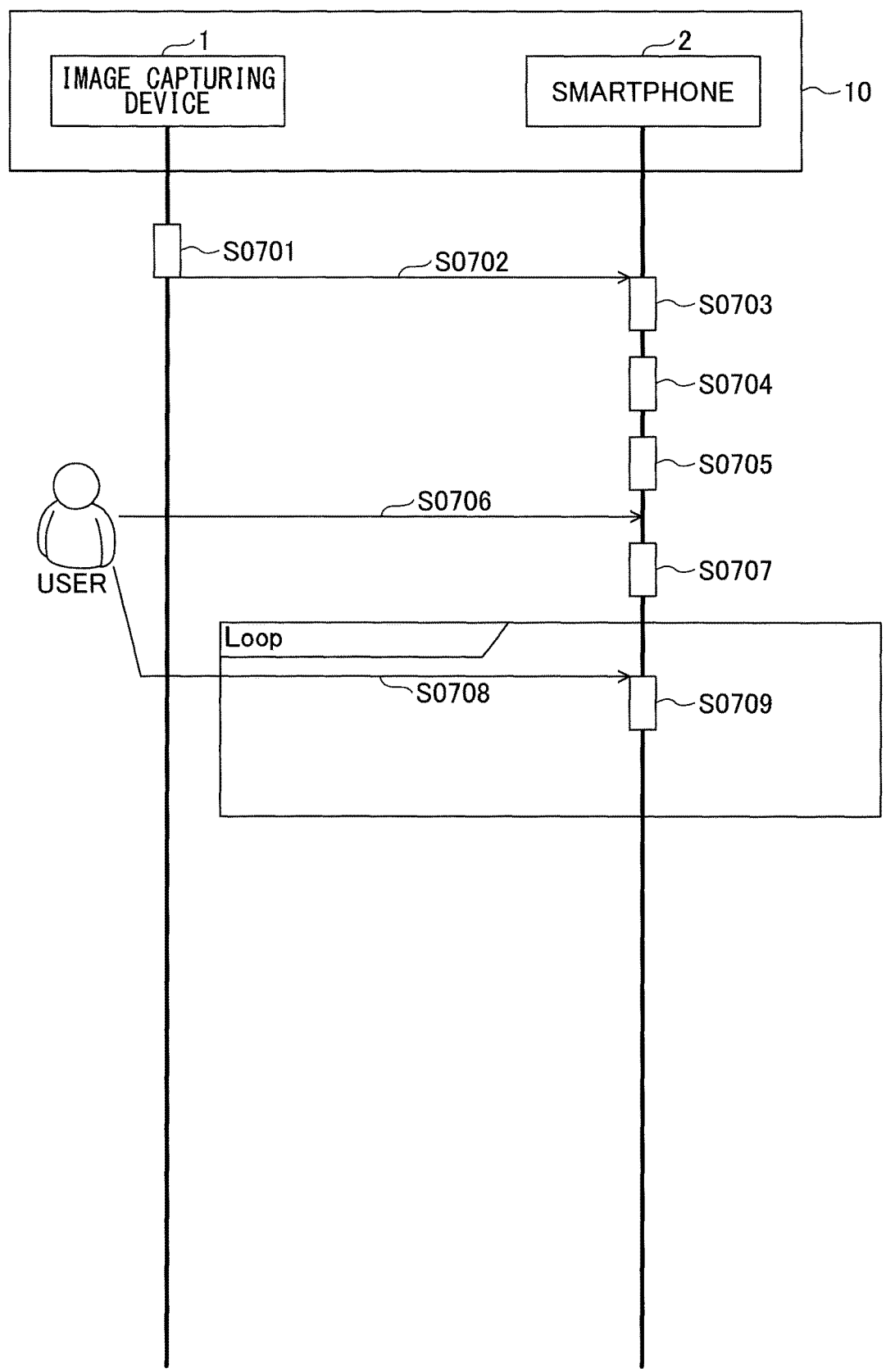
FIG. 9 is a sequence diagram illustrating an example of an overall process by the image processing system according to an embodiment of the present disclosure.

FIG. 9 is a sequence diagram illustrating an example of overall processing by the image processing system according to the embodiment of the present disclosure. For example, the image processing system 10 executes the following process to generate a synthesized image.

At step S0701, the image capturing device 1 executes a process of generating a celestial sphere image. Note that the celestial sphere image is generated from the hemisphere images illustrated in (a) and (b) of FIG. 6, which are captured in advance, by the following process by the image capturing device 1.

Figure 10:
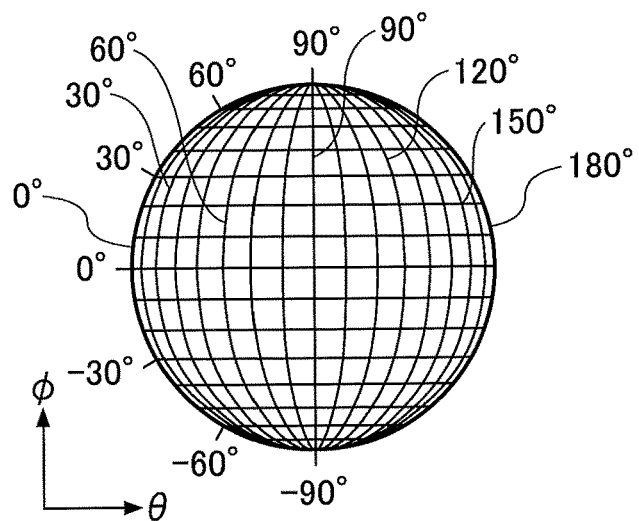
FIG. 10 is a diagram (version 1) illustrating an example of a celestial sphere image according to an embodiment of the present disclosure.
Figure 11:
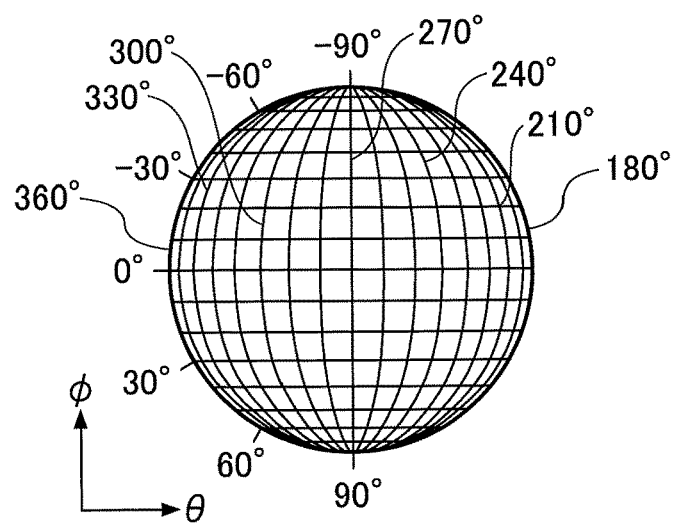
FIG. 11 is a diagram (version 2) illustrating the example of the celestial sphere image according to an embodiment of the present disclosure.

FIG. 10 through FIG. 13 are diagrams illustrating an example of the celestial sphere image according to the embodiment of the present disclosure. Note that FIG. 10 is a diagram representing the hemisphere image illustrated in (a) of FIG. 6 in which points with the same incident angle with respect to the optical axis in the horizontal direction and in the vertical direction are connected. In the following, the incident angle in the horizontal direction with respect to the optical axis is denoted by "θ," and the incident angle in the vertical direction with respect to the optical axis is denoted by "φ." Similar to FIG. 10, FIG. 11 is a diagram representing the hemisphere image illustrated in (b) of FIG. 6 in which points with the same incident angle with respect to the optical axis in the horizontal direction and in the vertical direction are connected.

Figure 12:
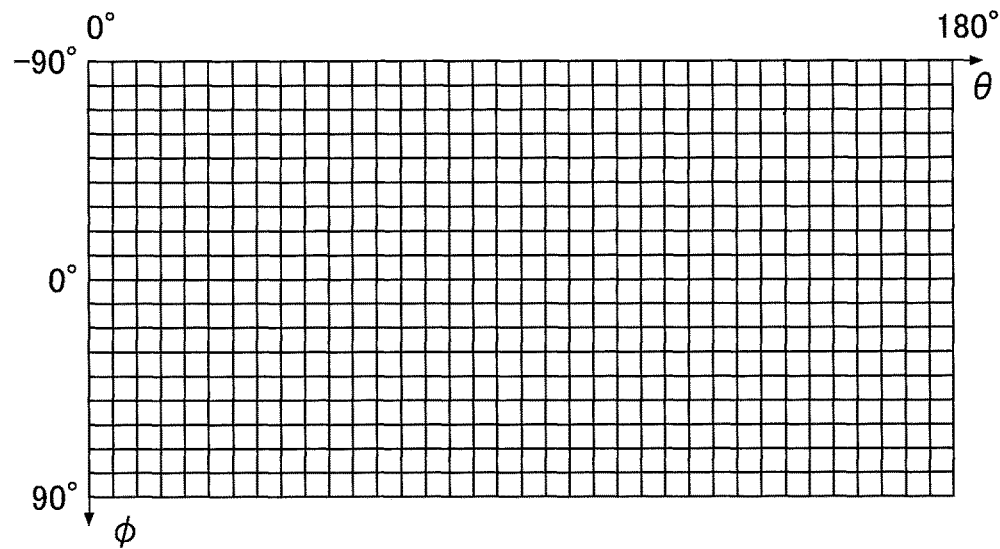
FIG. 12 is a diagram (version 3) illustrating the example of the celestial sphere image according to an embodiment of the present disclosure.
Figure 13:
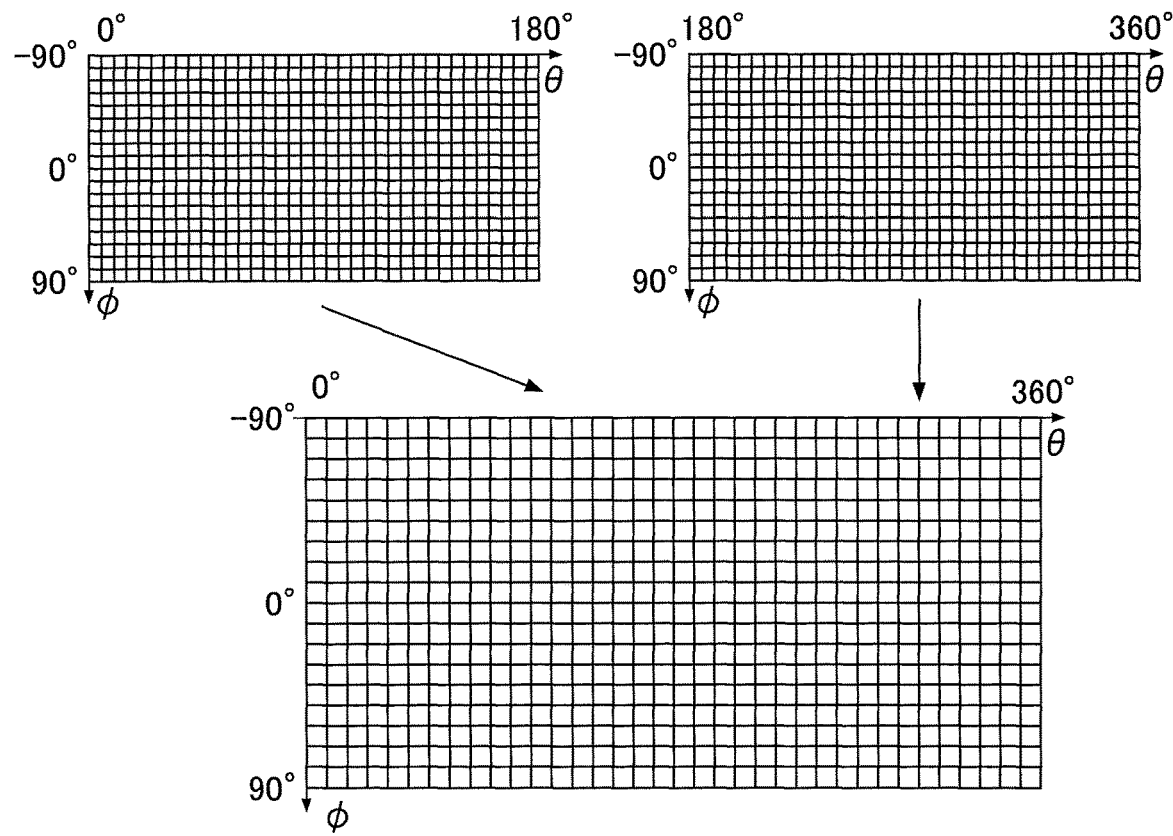
FIG. 13 is a diagram (version 4) illustrating the example of the celestial sphere image according to an embodiment of the present disclosure.

FIG. 12 is a diagram illustrating an example of an image processed by the Mercator Projection method. Specifically, the image illustrated in FIG. 12 is an image that is generated by associating the images illustrated in FIG. 10 and FIG. 11 by a LUT (LookUpTable) generated in advance, and by processing by an equidistant cylindrical projection method. After the state indicated in FIG. 12 is obtained, by synthesizing the images illustrated in FIG. 10 and FIG. 11, respectively, as illustrated in FIG. 13, the celestial sphere image is generated by the image capturing device. As described above, the synthesizing process is, for example, a process of generating the celestial sphere image using two hemisphere images in the states illustrated in FIG. 12. Note that the synthesizing process is not limited to the process of simply arranging continuously the hemisphere images, which are in the states illustrated in FIG. 12, such as that of illustrated in FIG. 13. For example, if the horizontal center of the celestial sphere image is not θ=180°, in the synthesizing process, the image capturing device first preprocesses the hemisphere image illustrated in (a) of FIG. 6 to arrange the hemisphere image at the center of the celestial sphere image. Subsequently, the image capturing device may divide the image obtained by preprocessing the hemisphere image illustrated in FIG. 6 (b) with sizes that can be arranged at the left and the right parts of the image to be generated, and may synthesize the hemisphere images to generate the celestial sphere image illustrated in (c) of FIG. 6.

The process of generating the celestial sphere image is not limited to the equidistant cylindrical projection method. For example, there is a case of upside down such that, in the φ direction, the arrangement of the pixels of the hemispherical image illustrated in FIG. 11 and the arrangement of the pixels of the hemispherical image illustrated in FIG. 10 are inverted in the vertical direction, and, in the θ direction, the arrangements of the pixels are inverted in the horizontal direction. As described above, in the upside down case, in the preprocessing, the image capturing device may perform a process of rotating the hemisphere image illustrated in FIG. 11 by 180°, so that the hemisphere image illustrated in FIG. 11 is aligned with the arrangement of the pixels in the φ direction and the θ direction in FIG. 10.

Further, in the process of generating the celestial sphere image, an aberration correcting process may be performed in which distortion aberration in each of the hemisphere images illustrated in FIG. 10 and FIG. 11 is corrected. Furthermore, the process of generating the celestial sphere image may include, for example, a shading correction, a gamma correction, a white balance, image stabilization, optical black correction processing, a defect pixel correction process, edge emphasis processing, and linear correction processing. Note that, for example, if the coverage of the hemisphere image overlaps the coverage of the other hemisphere image, by performing correction using pixels of an object captured in the overlapped coverage, the hemisphere images can be synthesized with high accuracy in the synthesizing process.

By such a process of generating the celestial sphere image, the image capturing device 1 generates the celestial sphere image from the captured plurality of hemisphere images. Note that the celestial sphere image may be generated by another process. In the following, an example is described in which the celestial sphere image generated by the depicted method is used.

Referring back to FIG. 9, at step S0702, the smartphone 2 obtains the celestial sphere image generated at step S0701 through a network. In the following, an example is described in which the smartphone 2 obtains the celestial sphere image illustrated in FIG. 13.

At step S0703, the smartphone 2 generates a celestial panoramic image from the celestial sphere image obtained at step S0702. The celestial panoramic image is the image described below.

Figure 14:
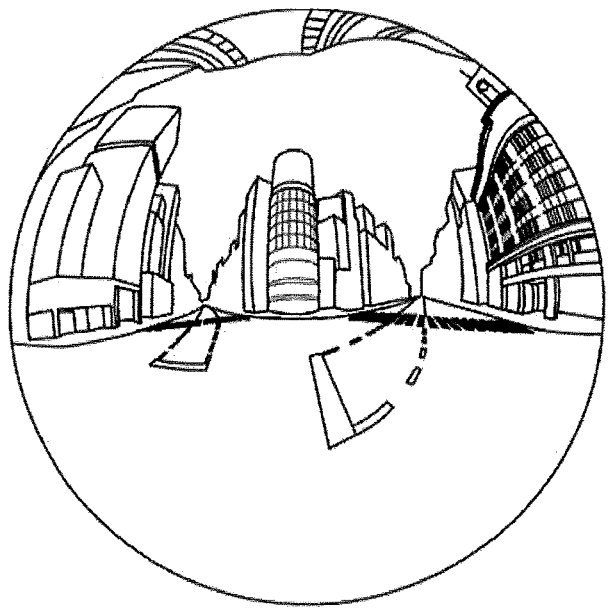
FIG. 14 is a diagram illustrating an example of a celestial panoramic image according to an embodiment of the present disclosure.

FIG. 14 is a diagram illustrating an example of the celestial panoramic image according to the embodiment of the present disclosure. For example, at step S0703 illustrated in FIG. 9, the smartphone 2 generates the celestial panoramic image illustrated in FIG. 14 from the obtained celestial sphere image illustrated in FIG. 13. Note that, as depicted, the celestial panoramic image is an image obtained by pasting the celestial sphere image in a spherical shape.

The process of generating the celestial panoramic image is, for example, implemented by an API (Application Programming Interface), such as OpenGL ES (OpenGL (registered trademark) for Embedded Systems). Specifically, the celestial panoramic image is generated by first dividing the pixels of the celestial sphere image into triangles, and subsequently joining vertices P of the triangles (which are referred to as the vertices P, hereinafter) and pasting the triangles as a polygon.

Referring back to FIG. 9, at step S0704, the smartphone 2 inputs a user's operation for selecting an image. Specifically, first, at step S0704, the smartphone 2 displays, for example, a thumbnail image, which is an image obtained by reducing the celestial panoramic image generated at step S0703. Namely, if a plurality of celestial panoramic images are stored in the smartphone 2, the smartphone 2 outputs the thumbnail images as a list so as to allow the user to select, from the plurality of celestial panoramic images, the celestial panoramic image that is to be processed in the subsequent processing. At step S0704, the smartphone 2 inputs, for example, a user's operation for selecting one thumbnail image from the list of thumbnail images. In the following, a process is performed in which the celestial panoramic image selected at step S0704 is the target to be processed.

At step S0705, the smartphone 2 generates an initial image based on the celestial panoramic image selected at step S0704. Note that the initial image is, for example, the image described below.

Figure 15:
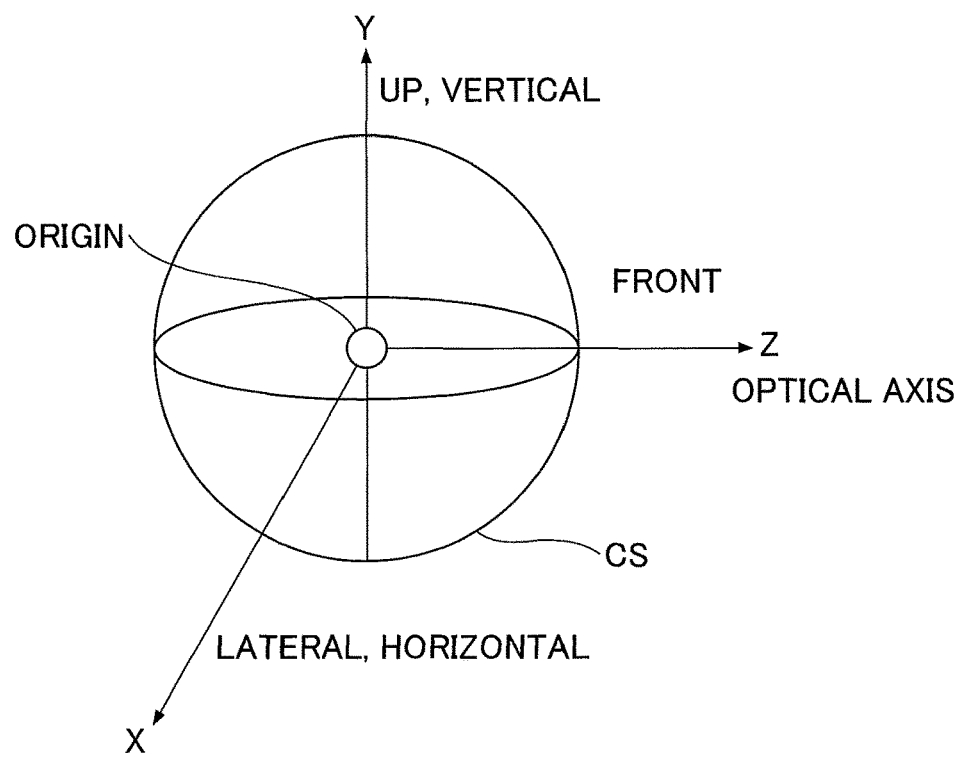
FIG. 15 is a diagram (version 1) illustrating an example of an initial image according to an embodiment of the present disclosure.

FIG. 15 through FIG. 18 are diagrams illustrating an example of the initial image according to the embodiment of the present disclosure. Specifically, first, FIG. 15 is a diagram illustrating a three-dimensional coordinate system, which is for illustrating an example of the initial image according to the embodiment of the present disclosure. In the following, the description is made in the three-dimensional coordinate system with XYZ axes, as illustrated in FIG. 15. In this example, it is assumed that the smartphone 2 installs a virtual camera 3 at the position of the origin, and that the smartphone 2 generates each image at the viewpoint from the virtual camera 3. For example, in the coordinate system illustrated in FIG. 15, the celestial panoramic image is represented as a three-dimensional sphere CS. Note that the virtual camera 3 corresponds to the user's viewpoint of viewing the celestial panoramic image with respect to the installation position, namely, the celestial panoramic image that is the three-dimensional sphere CS from the origin.

Figure 16:
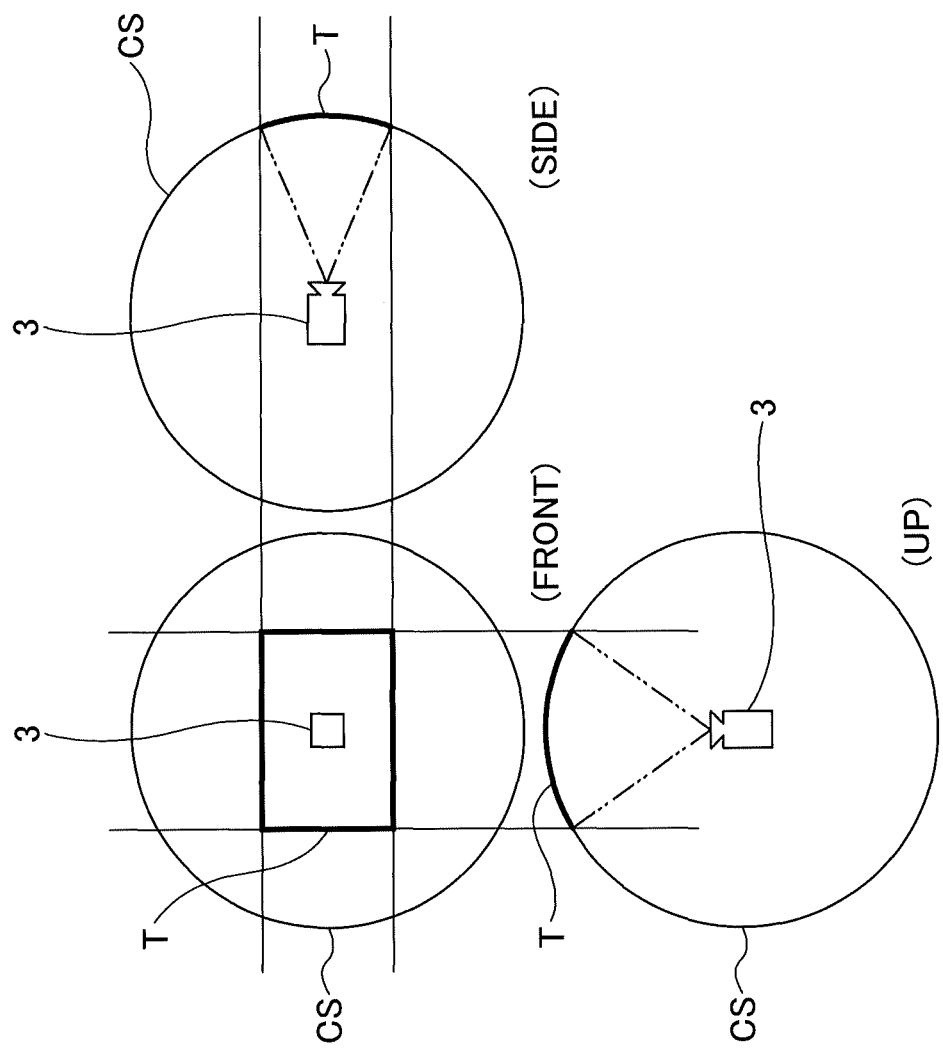
FIG. 16 is a diagram (version 2) illustrating the example of the initial image according to an embodiment of the present disclosure.

FIG. 16 is a diagram illustrating an example of a predetermined area by the virtual camera according to the embodiment of the present disclosure. Specifically, FIG. 16 is an example in which FIG. 15 is illustrated by three views. Namely, FIG. 15 and FIG. 16 illustrate the same state. Accordingly, as depicted, it is assumed that the virtual camera 3 is installed at the origin in FIG. 16.

Figure 17:
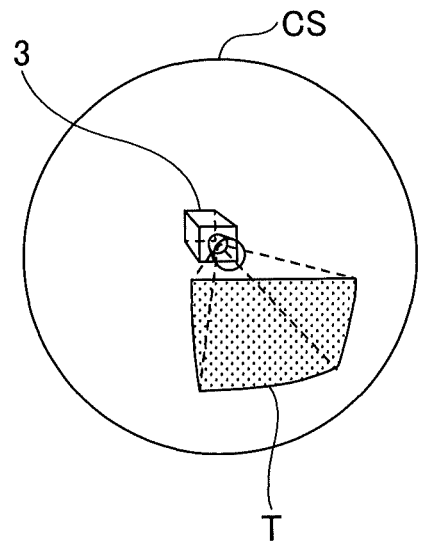
FIG. 17 is a diagram (version 3) illustrating the example of the initial image according to an embodiment of the present disclosure.

Next, FIG. 17 is a projection view of an example of the predetermined area by the virtual camera according to the embodiment of the present disclosure. Note that, in FIG. 17, the predetermined area T is an area obtained by projecting the viewing angle of the virtual camera 3 onto the three-dimensional sphere CS. In the following, as depicted, an example is described in which the smartphone 2 generates an image of the predetermined area T. Namely, the smartphone 2 generates an image based on the predetermined area T. The predetermined area T is determined as follows, for example.

Figure 18:
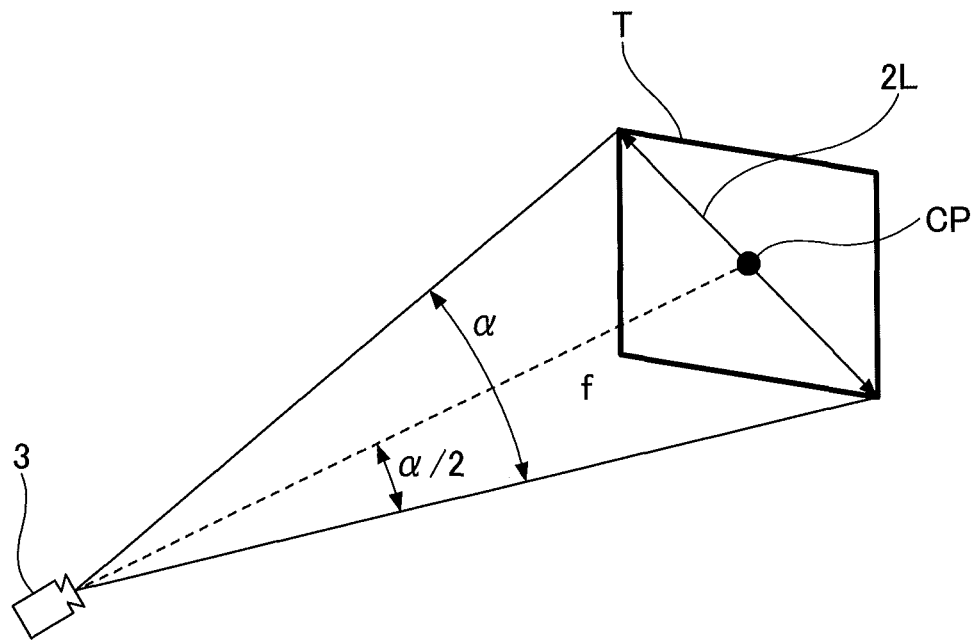
FIG. 18 is a diagram (version 4) illustrating the example of the initial image according to an embodiment of the present disclosure.

FIG. 18 is a diagram illustrating an example of the information for determining the predetermined area by the virtual camera according to the embodiment of the present disclosure. In this example, the predetermined area T is determined by the predetermined area information (x, y, α), for example. Specifically, as illustrated in FIG. 18, the viewing angle α is an angle representing an angle of view of the virtual camera 3. The coordinates of the center point CP of the predetermined area T with respect to the diagonal angle of view 2L in the predetermined area T indicated by the viewing angle α are indicated by (x, y) of the predetermined area information.

Next, the distance from the virtual camera 3 to the center point CP is represented by the formula 1 below.

[Expression 1]

$$f = \tan(\alpha/2) \quad (1)$$

The initial image is an image generated based on the predetermined area T, which is determined based on an initial setting that is set in advance. For example, the initial setting is set by a user, such as (x, y, α)=(0, 0, 34).

Then, when an operation of changing the angle of view, namely, a zoom operation is input, the smartphone 2 executes a zooming process as follows. Here, the zooming process is a process of generating an image in which a predetermined area is enlarged or reduced based on a user's operation that is input. In the following, an operation amount input by the zoom operation is referred to as the "change amount dz." First, when the zoom operation is input, the smartphone 2 obtains the change amount dz based on the user's operation that is input. Then, the smartphone 2 calculates the following formula (2) based on the change amount dz.

[Expression 2]

$$\alpha = \alpha 0 + m \times dz \quad (2)$$

Here, "α" in the above-described formula (2) is the viewing angle α of the virtual camera 3 illustrated in FIG. 18. Additionally, "m" indicated in the above-described formula (2) is a coefficient for adjusting the zoom amount, which is a value set in advance by the user. Further, "α0" in the above-described formula (2) is the viewing angle α of the virtual camera 3 in the initial state, namely, the viewing angle α in the initial image generated at step S0705.

Next, the smartphone 2 determines a range of the predetermined area T illustrated in FIG. 17 using the viewing angle α calculated based on the formula (2) in the projection matrix.

Here, when the user further performs a zoom operation with which the change amount becomes dz2, the smartphone 2 calculates the following formula (3).

[Expression 3]

$$\alpha = \alpha 0 + m \times (dz + dz2) \quad (3)$$

As indicated in the above-described formula (3), the viewing angle α is calculated based on the value obtained by adding the change amounts by the respective zoom operations. As described above, even if a plurality of zoom operations are performed, the smartphone 2 can maintain consistent operability by first performing calculation of the viewing angle α of the celestial sphere.

Note that the zooming process is not limited to the process based on the above-described formula (2) or the above-described formula (3). For example, the zooming process may be implemented by combining the viewing angle α and the change of the viewing position of the virtual camera 3 (FIG. 16). Specifically, the following zooming process may be executed.

Figure 19:
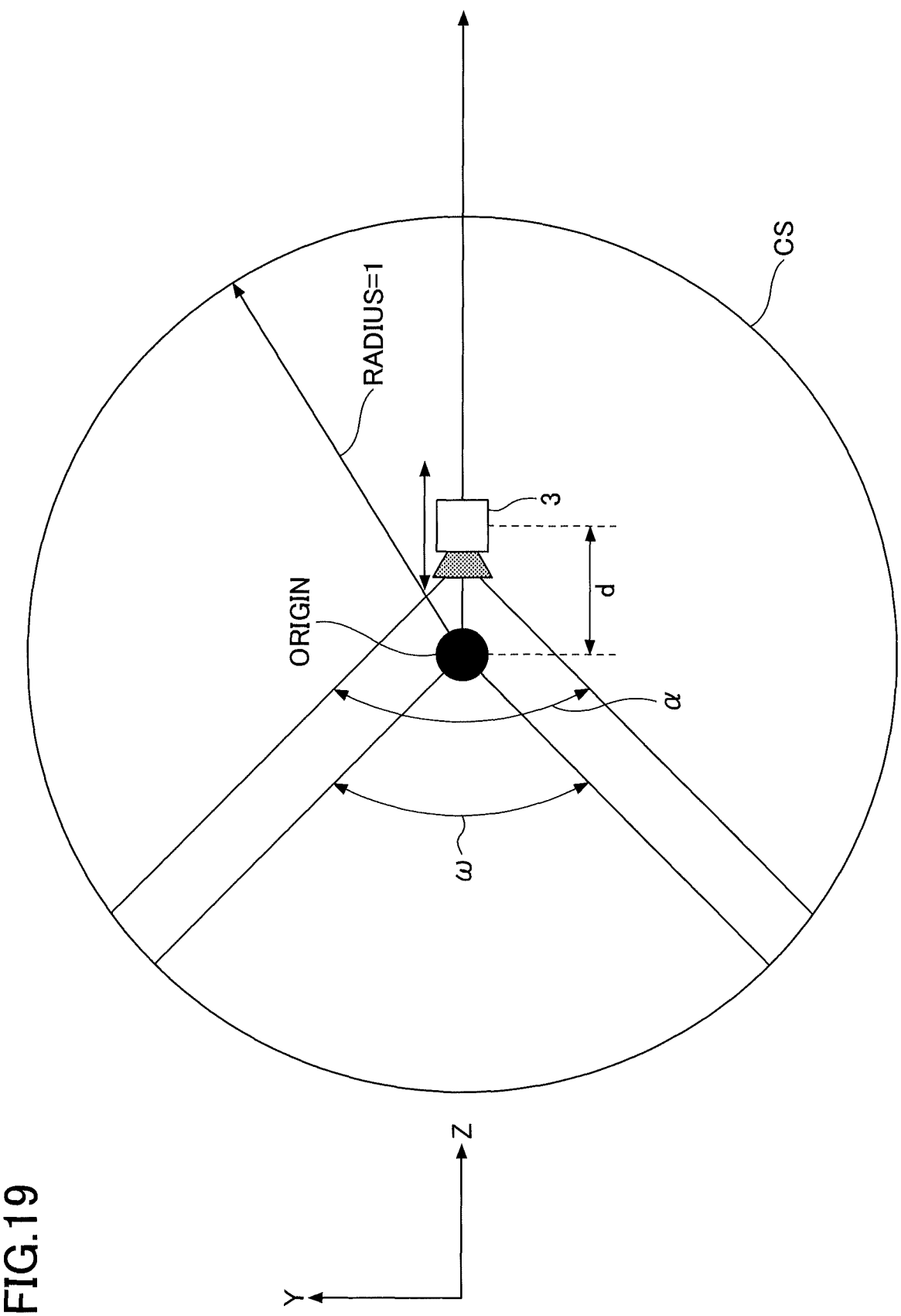
FIG. 19 is a diagram illustrating an example of another zooming process according to an embodiment of the present disclosure.

FIG. 19 is a diagram illustrating an example of another zooming process according to the embodiment of the present disclosure. Note that the diagram is a model diagram for illustrating the other zooming process. The three-dimensional sphere CS is the same as the three-dimensional sphere CS illustrated in FIG. 10. Furthermore, in the following description, an example is described in which the radius of the three-dimensional sphere CS is 1.

First, the depicted origin is the initial position of the virtual camera 3. Then, the virtual camera 3 moves on the optical axis, that is, on the Z axis illustrated in FIG. 15 to change the position. Next, the shift d of the virtual camera 3 is represented by the distance from the origin. For example, when the virtual camera 3 is positioned at the origin, namely, in the initial state, the shift d is 0.

Based on the shift d and the viewing angle α of the virtual camera 3, the range that is the predetermined area T illustrated in FIG. 17 is indicated by the angle of view ω. For example, the depicted angle of view ω is the angle of view when the virtual camera 3 is located at the origin, namely, when d=0. When the virtual camera 3 is located at the origin, namely, when d=0, the angle of view ω is equal to the viewing angle α. When the virtual camera 3 is separated from the origin, namely, when the value of d becomes greater than 0, the angle of view ω and the viewing angle α indicate different ranges. The other zooming process is, for example, the process of changing the angle of view ω as follows.

FIG. 20 shows a table for illustrating an example of the other zooming process according to the embodiment of the present disclosure. Note that the explanatory table 4 illustrates an example of a case in which the range of the angle of view ω is from 60° to 300°. As illustrated in the explanatory table 4, the smartphone 2 determines which of the viewing angle α and the shift d of the virtual camera 3 is to be preferentially changed based on the zoom designation value ZP.

Note that the "range" is a range determined based on the zoom designation value ZP. Further, the "output magnification" is an output magnification of an image calculated based on the image parameter determined by the other zooming process. Further, the "zoom designation value ZP" is a value corresponding to the angle of view to be output.

As described above, in the other zooming process, the process of determining the shift d and the viewing angle α is changed based on the zoom designation value ZP. Specifically, as illustrated in the explanatory table 4, the process to be executed by the other zooming process is determined to be one of the depicted four methods based on the zoom designation value ZP. In this example, the range of the zoom designation value ZP is divided into four ranges of "A to B," "B to C," "C to D," and "D to E."

Further, the "angle of view ω" is the angle of view ω corresponding to the image parameter determined by the other zooming process. Furthermore, the "parameters to be changed" are descriptions illustrating the parameters to be changed by the respective four methods based on the zoom designation value ZP. The "remarks" are the remarks on the "parameter to be changed."

In the explanatory table 4, the "view WH" is a value indicating the width or the height of the output area. For example, if the output area is landscape, the "viewWH" indicates the width value. If the output area is vertically long, the "view WH" indicates the height value. Namely, the "viewWH" is a value indicating the size in the longitudinal direction of the output area.

In the explanatory table 4, the "imgWH" is a value indicating the width or the height of the output image. For example, if the output area is laterally long, the "viewWH" indicates the width value of the output image. If the output area is vertically long, the "viewWH" indicates the height value of the output image. Namely, the "viewWH" is a value indicating the size in the longitudinal direction of the output image.

Further, in the explanatory table 4, the "imgDeg" is a value indicating an angle of a display range of the output image. Specifically, if the width of the output image is to be indicated, the "imgDeg" is 360 degrees. If the height of the output image is to be indicated, the "imgDeg" is 180 degrees.

FIG. 21 through FIG. 25 are diagrams illustrating an example of the "range" of the other zooming process according to the embodiment of the present disclosure. The depicted example illustrates an example of the range" displayed on the image and the image when the above-described other zooming process is performed. In the following, an example of a case of zoom-out is described using the depicted example. In the left diagram of each of FIG. 21 through FIG. 25 illustrates an example of the image to be output. The right diagram of each of FIG. 21 through FIG. 25 is a diagram illustrating an example of the state of the virtual camera 3 at the time of output by the same model diagram that is the same as FIG. 11.

Specifically, FIG. 21 illustrates an example of the output image and the "range" when the zoom designation value ZP is input in which the "range" in the explanatory diagram 4 illustrated in FIG. 20 is "A to B." As described above, when the zoom designation value ZP is a value in "A to B," the viewing angle α in the virtual camera 3 (FIG. 19) is fixed to, for example, α=60°. Further, suppose that the zoom designation value ZP is "A to B" and the shift d of the virtual camera 3 is changed in a state in which the viewing angle α is fixed as shown in FIG. 21. In the following, an example is described in which the shift d of the virtual camera 3 is changed to be increased in the state in which the viewing angle α is fixed. In this case, the angle of view ω expands. Namely, if the zoom designation value ZP is set to "A to B", the viewing angle α is fixed, and the shift d of the virtual camera 3 is increased, the zoom-out process can be implemented. Here, when the zoom designation value ZP is "A to B," the shift d of the virtual camera 3 is from 0 to the radius of the three dimensional sphere CS. Specifically, in the case illustrated in FIG. 21 through FIG. 25, the shift d of the virtual camera 3 becomes a value in "0 to 1" because the radius of the three-dimensional sphere is 1. Further, the shift d of the virtual camera 3 becomes a value corresponding to the zoom designation value ZP.

Next, FIG. 22 illustrates an example of the output image and the "range" when the zoom designation value ZP is input in which the "range" in the explanatory diagram 4 illustrated in FIG. 20 is "B to C." Here, the zoom designation value ZP is large for "B to C" compared to "A to B." Then, suppose that the zoom designation value ZP is "B to C" and the shift d of the virtual camera 3 is fixed to a value at which the virtual camera 3 is positioned at the outer edge of the three-dimensional sphere CS. In this case, as illustrated in FIG. 22, the shift d of the virtual camera 3 is fixed to 1 that is the radius of the three-dimensional sphere CS. Furthermore, supposed that the viewing angle α is changed in the state in which the zoom designation value ZP is "B to C" and the shift d of the virtual camera 3 is fixed. In the following, an example is described in which the viewing angle α is changed to be increased in the state in which the shift d of the virtual camera 3 is fixed. In this case, the angle of view ω expands as illustrated in FIG. 22 from FIG. 21. Namely, if the zoom designation value ZP is set to "B to C," the shift d of the virtual camera 3 is fixed, and the viewing angle α is increased, the zoom-out process can be implemented. Note that, when the zoom designation value ZP is "B to C," the viewing angle α is calculated by ω/2. Furthermore, when the zoom designation value ZP is "B to C," the range of the viewing angle α is from 60° to 120°, which is a fixed value for the case of "A to B."

When the zoom designation value ZP is "A to B" or "B to C," the angle of view ω is equal to the zoom designation value ZP. Furthermore, when the zoom designation value ZP is "A to B" and "B to C," the angle of view ω increases.

FIG. 23 illustrates an example of the output image and the "range" when the zoom designation value ZP is input in which the "range" in the explanatory diagram 4 illustrated in FIG. 20 is "C to D." Here, the zoom designation value ZP is large for "C to D" compared to "B to C." Then, suppose that the zoom designation value ZP is "C to D" and the viewing angle α is fixed to α=120°, for example. Next, suppose that, as illustrated in FIG. 23, the zoom designation value ZP is "C to D" and the shift d of the virtual camera 3 is changed in the state in which the viewing angle α is fixed. In the following, an example is described in which, while the viewing angle α is fixed, the shift d of the virtual camera 3 is changed to be increased. As a result, the angle of view w expands. Further, the shift d of the virtual camera 3 is calculated by a formula based on the zoom designation value ZP illustrated in the explanatory table 4 (FIG. 20). Note that, if the zoom designation value ZP is "C to D," the shift d of the virtual camera 3 is changed to the maximum display distance dmax1. Note that the maximum display distance dmax1 is a distance with which the three-dimensional sphere CS can be displayed at the maximum in an output area of the smartphone 2 (FIG. 1). The output area is, for example, a size of a screen on which the smartphone 2 outputs images. Additionally, the maximum display distance dmax1 is, for example, a state such as that illustrated in FIG. 24. Furthermore, the maximum display distance dmax1 is calculated by the formula (4) described below.

[Expression 4]

$$dmax1 = \frac{1}{\sin\left\{\alpha \tan\left[\tan(\frac{\omega}{2}) * \frac{(viewW^2 + viewH^2)^{\frac{1}{2}}}{viewW}\right]\right\}} \quad (4)$$

Note that, in the above-described formula (4), the "viewW" is a value indicating the width of the output area of the smartphone 2. Further, in the above-described formula (4), the "viewH" is a value indicating the height of the output area of the smartphone 2. The same notations apply to the following. As described above, the maximum display distance dmax1 is calculated based on the output area of the smartphone, namely, the values of the "viewW" and the "viewH."

FIG. 24 illustrates an example of the output image and the "range" when the zoom designation value ZP is input in which the "range" in the explanatory diagram 4 illustrated in FIG. 20 is "D to E." Here, the zoom designation value ZP is large for "C to D" compared to "B to C." Then, suppose that the zoom designation value ZP is "D to E" and the viewing angle α is fixed to α=120°, for example. Next, suppose that, as illustrated in FIG. 23, the zoom designation value ZP is "C to D" and the shift d of the virtual camera 3 is changed in the state in which the viewing angle α is fixed. The shift d of the virtual camera 3 is changed to the limit display distance dmax2. Note that the limit display distance dmax2 is a distance with which the three-dimensional sphere CS is inscribed in the output area of the smartphone 2 to be displayed. Specifically, the limit display distance dmax2 is calculated by the formula (5) below. The limit display distance dmax2 is, for example, a state such as that indicated in FIG. 25.

[Expression 5]

$$dmax2 = \frac{1}{\sin\left\{\alpha \tan\left[\tan(\frac{\omega}{2}) * \frac{viewH}{viewW}\right]\right\}} \quad (5)$$

As indicated in the above-described formula (5), the limit display distance dmax2 is calculated based on values of the "viewW" and the "viewH", which define the output area of the smartphone 2. In addition, the limit display distance dmax2 indicates a maximum range that can be output by the smartphone 2, namely, the limit value up to which the shift d of the virtual camera 3 can be increased. The smartphone 2 may limit the input value so that the zoom designation value ZP is within the range described in the explanatory table 4 (FIG. 20), namely, the value of the shift d of the virtual camera 3 is less than or equal to the limit display distance dmax2. By such a limitation, the smartphone 2 is in a state in which the output image fits the screen that is the output area, or in a state in which the image can be output to the user with a predetermined output magnification, and zoom out can be implemented. By the process of "D to E," the smartphone 2 can cause the user to recognize that the output image is a celestial panorama.

Note that, when the zoom designation value ZP is "C to D" or "D to E", the angle of view ω is a value different from the zoom designation value ZP. Though the angle of view ω is continuous in the explanatory table 4 and in each of the ranges illustrated in FIG. 21 to FIG. 25, the angle of view ω may not be uniformly increased in accordance with the zoom out toward the wide angle side. That is, for example, if the zoom designation value ZP is "C to D," the angle of view ω increases in accordance with the shift d of the virtual camera 3. However, if the zoom designation value ZP is "D to E," the angle of view ω decreases in accordance with the shift d of the virtual camera 3. The decrease in the shift d of the virtual camera 3 in the case in which the zoom designation value ZP is "D to E" is caused by the reflection of the outside region of the three-dimensional sphere CS. As described above, when the zoom designation value ZP specifies a wide viewing area that is greater than or equal to 240°, the smartphone 2 can output a less awkward image to the user and can change the angle of view ω by changing the shift d of the virtual camera 3.

When the zoom designation value ZP is changed in the wide angle direction, the angle of view u is often widened. In this manner, when the angle of view ω is widened, the smartphone 2 fixes the viewing angle α of the virtual camera 3 and increases the shift d of the virtual camera 3. In this manner, by fixing the viewing angle α of the virtual camera 3, the smartphone 2 can reduce an increase in the viewing angle α of the virtual camera 3. Furthermore, by reducing the increase in the viewing angle α of the virtual camera 3, the smartphone 2 can output an image with less distortion to the user.

By fixing the viewing angle α of the virtual camera 3 and by increasing, by the smartphone 2, the shift d of the virtual camera 3, namely, by moving the virtual camera 3 in a direction to separate, the smartphone 2 can provide to the user open feeling of wide angle display. Further, the movement of the virtual camera 3 in the direction to separate is similar to the movement by a human being for confirming a wide range. Thus, the smartphone 2 can implement less awkward zoom out by the movement of the virtual camera 3 in the direction to separate.

When the zoom designation value ZP is "D to E," the angle of view ω decreases as the zoom designation value ZP changes in the wide angle direction. In this manner, when the zoom designation value ZP is "D to E," by decreasing the the angle of view ω, the smartphone 2 can provide to the user a feeling of getting away from the three-dimensional sphere CS. By providing to the user the feeling of getting away from the three-dimensional sphere CS, the smartphone 2 can output, to the user, a less awkward image.

As described above, by the other zoom process described in the explanatory table 4 (FIG. 20), the smartphone 2 can output a less awkward image to the user.

Note that the smartphone 2 is not limited to the case of changing only the shift d or the viewing angle α of the virtual camera 3 described in the explanation table 4. Namely, the smartphone 2 may preferentially change the shift d or the viewing angle α of the virtual camera 3 in the explanatory table 4. For example, for adjustment, the smartphone 2 may change the fixed value to a sufficiently small value. Additionally, the smartphone 2 is not limited to performing zoom out. For example, the smartphone 2 may perform zoom in.

Referring back to FIG. 9, at step S0706, the smartphone 2 inputs, for example, a user's operation for switching a state of editing the screen (which is referred to as the "editing mode," hereinafter). Upon detecting that the mode is switched to the editing mode, the smart phone 2 outputs a screen for editing.

At step S0707, the smartphone 2 outputs a screen for editing. In the following description, an example is described in which the screen described below is output.

Figure 26:
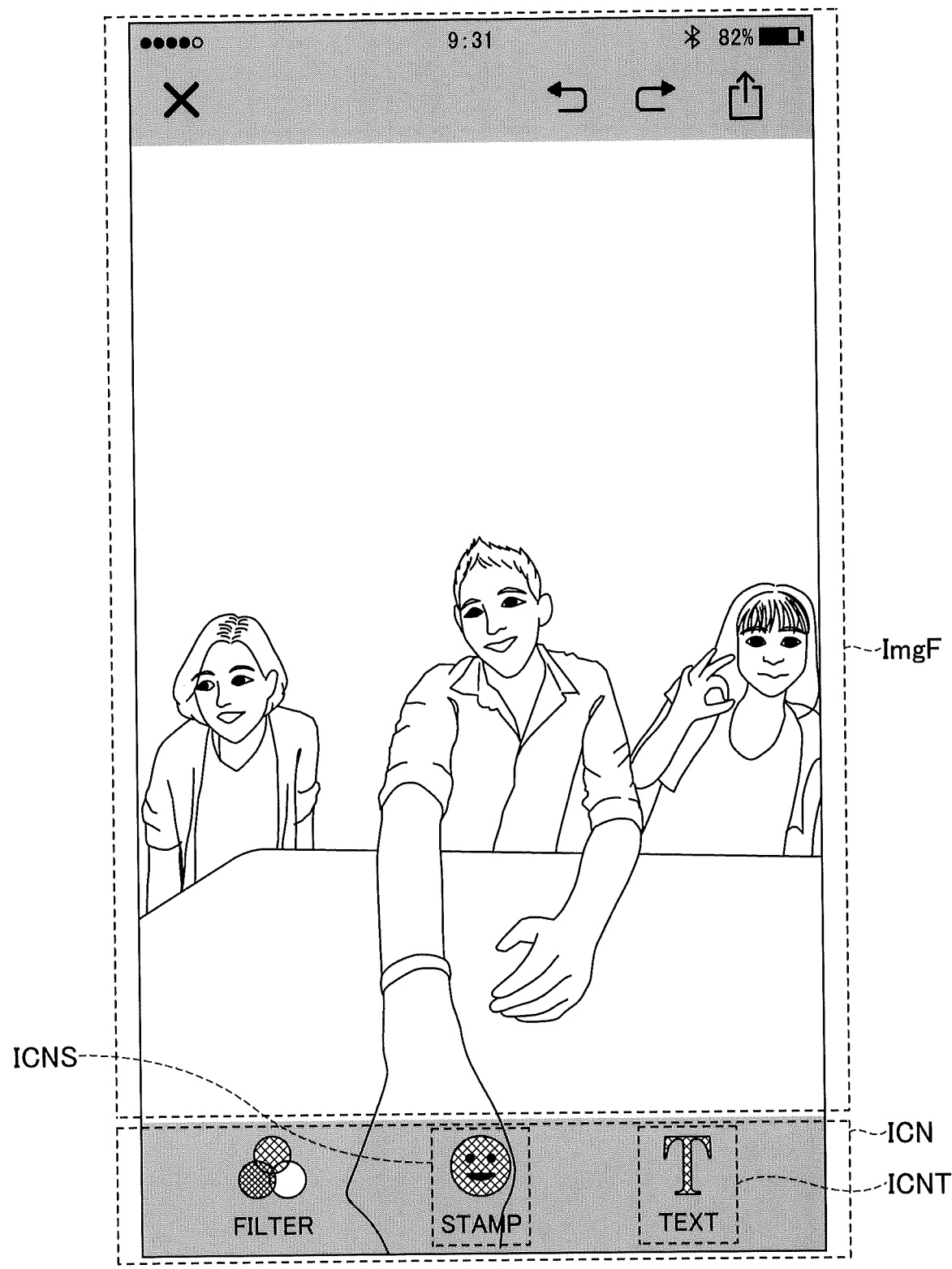
FIG. 26 is a diagram illustrating an example of an image and a GUI in an edit mode according to an embodiment of the present disclosure.

FIG. 26 is a diagram illustrating an example of a screen and a GUI in the editing mode according to the embodiment of the present disclosure. For example, the smartphone outputs a screen for editing (which is referred to as the edit screen, hereinafter), such as that of depicted. Note that, as depicted, the edit screen displays an initial image ImgF, which is an example of the first image, and an icon for editing (which is simply referred to as the icon ICN, hereinafter). In this manner, the user edits an image using a GUI (Graphical User Interface), such as the output icon ION. For example, as described below, editing is performed by the user's operation. Specifically, in the edit screen illustrated in FIG. 26, suppose that a stamp button IONS for switching a screen to a stamp selection screen (which is referred to as the stamp screen, hereinafter) is pressed by the user. As a result, for example, the following stamp screen is output by the smartphone.

Figure 27:
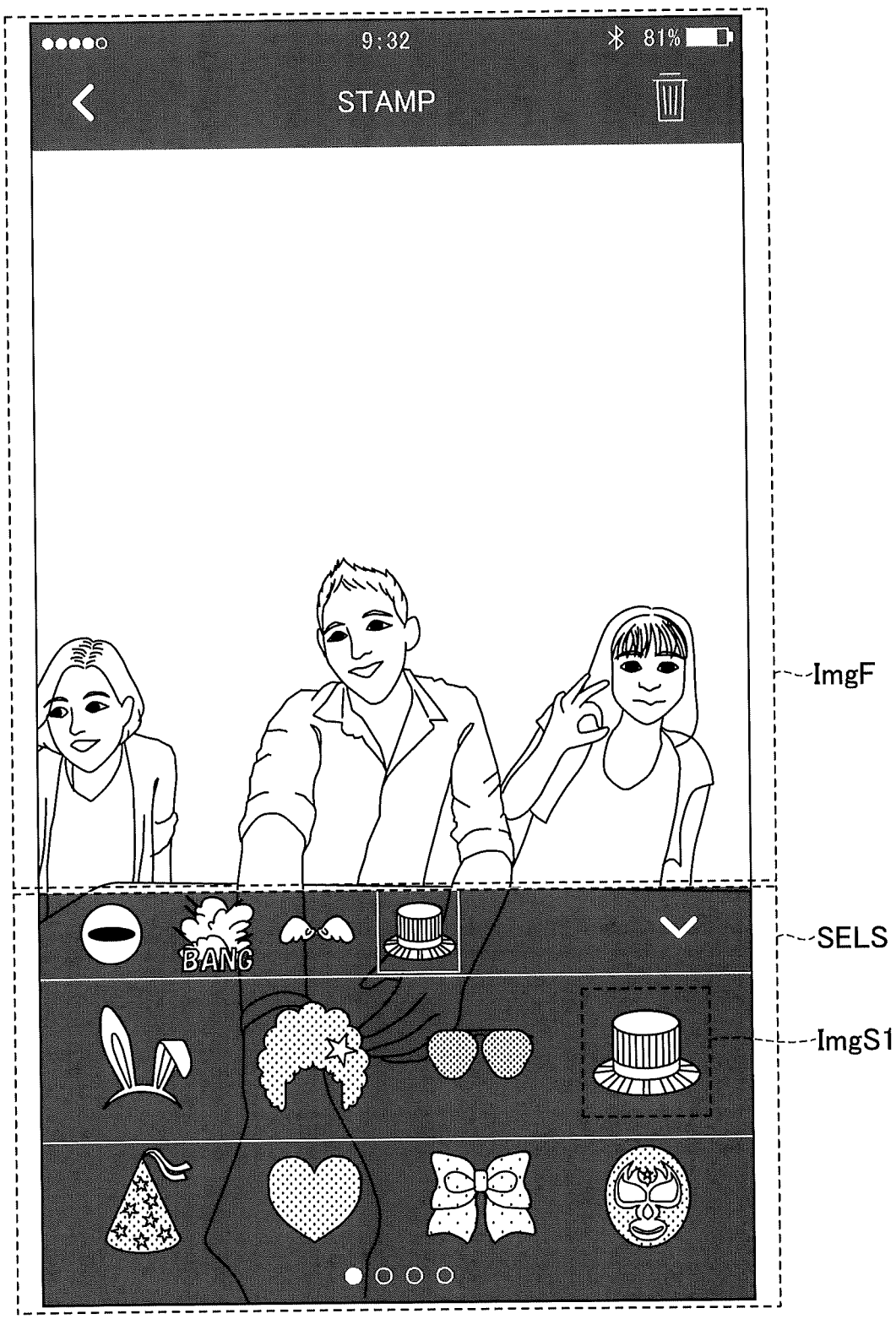
FIG. 27 is a diagram illustrating an example of a stamp screen according to an embodiment of the present disclosure.

FIG. 27 is a diagram illustrating an example of the stamp screen according to the embodiment of the present disclosure. Compared to the edit screen illustrated in FIG. 26, the depicted stamp screen differs in that a stamp selection menu SELS is displayed at the bottom of the screen. In this example, an image representing one stamp (which is referred to as the first stamp image, hereinafter), which is an example of the second image, is selected by the user's operation from the stamp selection menu SELS. Namely, by the stamp selection menu SELS, the user can input an operation to select a type of the second image to be superimposed on the initial image ImgF. For example, supposed that, by the user's operation, the depicted first stamp image ImgS1 is selected. As a result, the smartphone outputs the screen described below.

Figure 28:
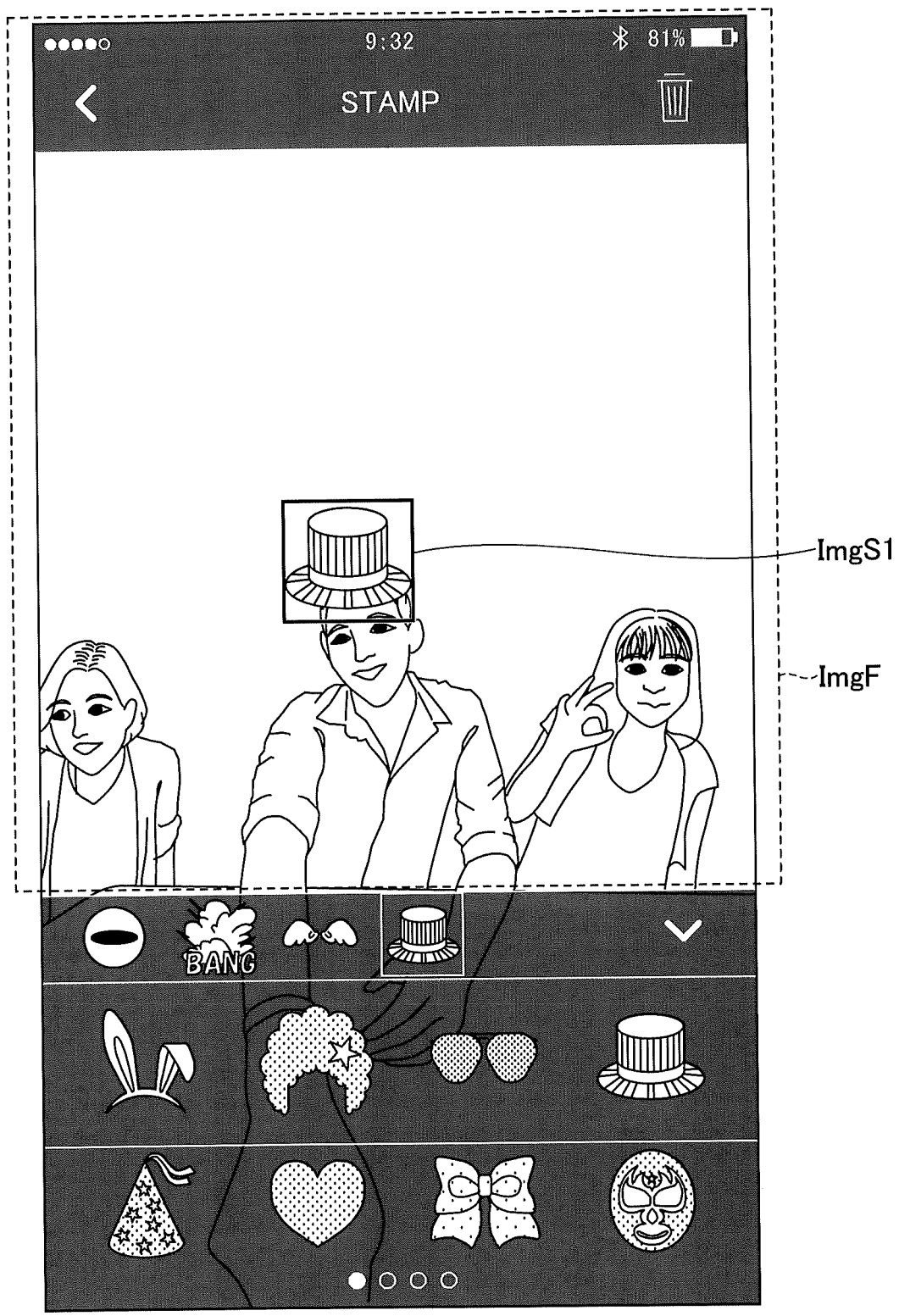
FIG. 28 is a diagram (version 1) illustrating an example of a screen on which a stamp is placed according to an embodiment of the present disclosure.

FIG. 28 is a diagram (version 1) illustrating an example of a screen in which a stamp is arranged according to the embodiment of the present disclosure. Compared to the screen illustrated in FIG. 27, the depicted screen differs in that the first stamp image ImgS1 selected form the stamp selection menu SELS (FIG. 27) is displayed in the initial image ImgF. Further, in this screen, the user can perform editing related to the first stamp image ImgS1. Specifically, for example, the user can specify a position on the initial image ImgF at which the first stamp image S1 is displayed. Namely, the user can perform arrangement for deciding a position on the initial image ImgF at which the first stamp image ImgS1 is to be output.

Here, once another second image, such as a stamp, is selected, the previous selection of the second image may preferably be determined. Namely, the second image may preferably be selected one by one. Suppose that the first stamp image ImgS1 is selected as depicted. In the selection, editing, such as that described above, may be performed. Next, upon determining the position of the first stamp image ImgS1, the user can select the next stamp. The image indicating the stamp selected subsequent to the first stamp image ImgS1 is referred to as the "second stamp image ImgS2" below. In the following, an example is described such that, upon selecting the next stamp, the previous stamp is determined.

Figure 29:
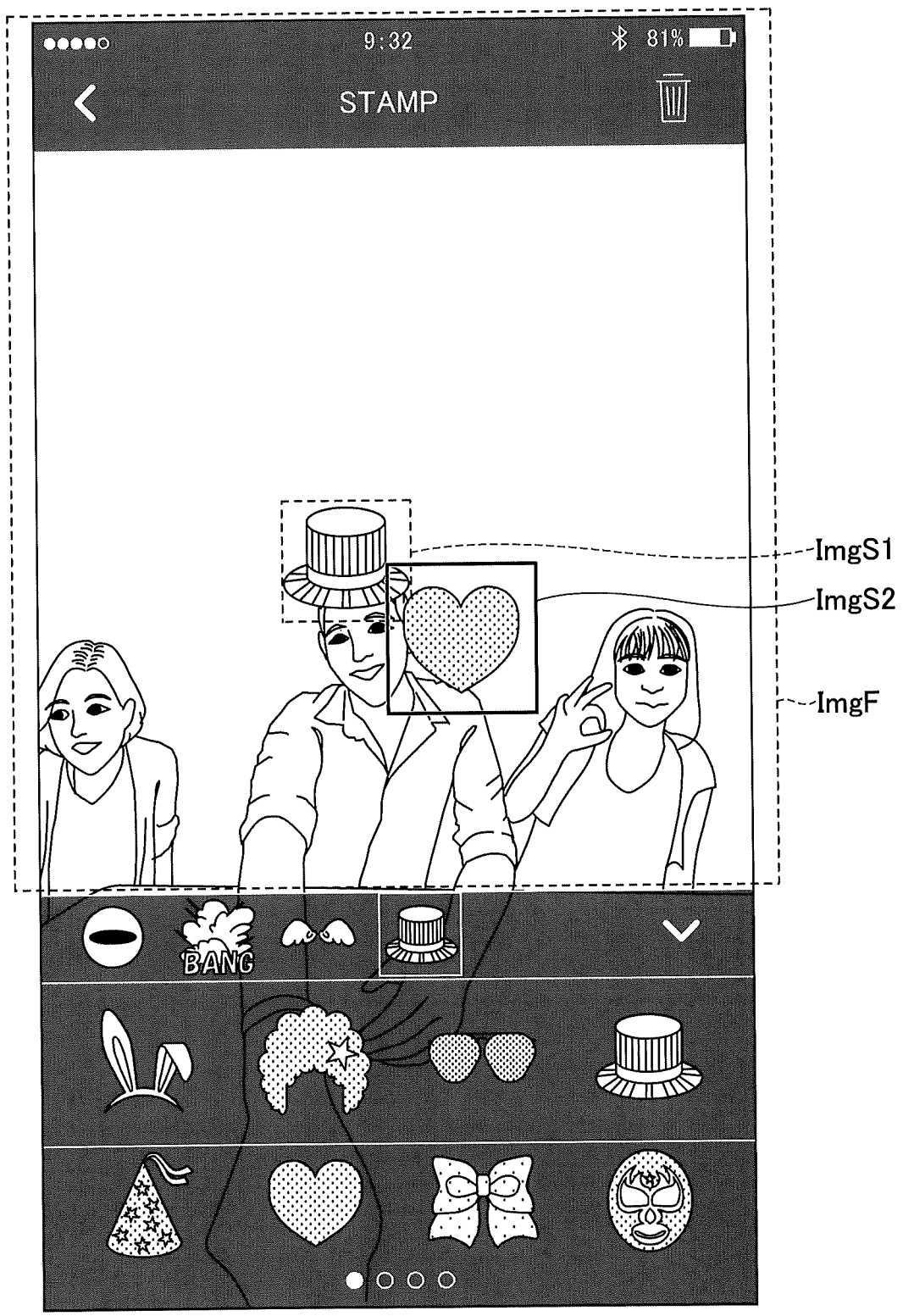
FIG. 29 is a diagram (version 2) illustrating the example of the screen on which stamps are placed according to an embodiment of the present disclosure.

FIG. 29 is a diagram (version 2) illustrating an example of a screen in which the stamp is arranged according to the embodiment of the present disclosure. For example, in a situation where editing on the second stamp image ImgS2 can be performed, the arrangement of the first stamp image ImgS1 may preferably be in a determined state. Namely, in this example, editing, such as changing the arrangement of the first stamp image ImgS1, is restricted. However, editing, such as changing the arrangement of the second stamp image ImgS2, can be performed. Namely, for example, the user can perform the following operations.

Figure 30:
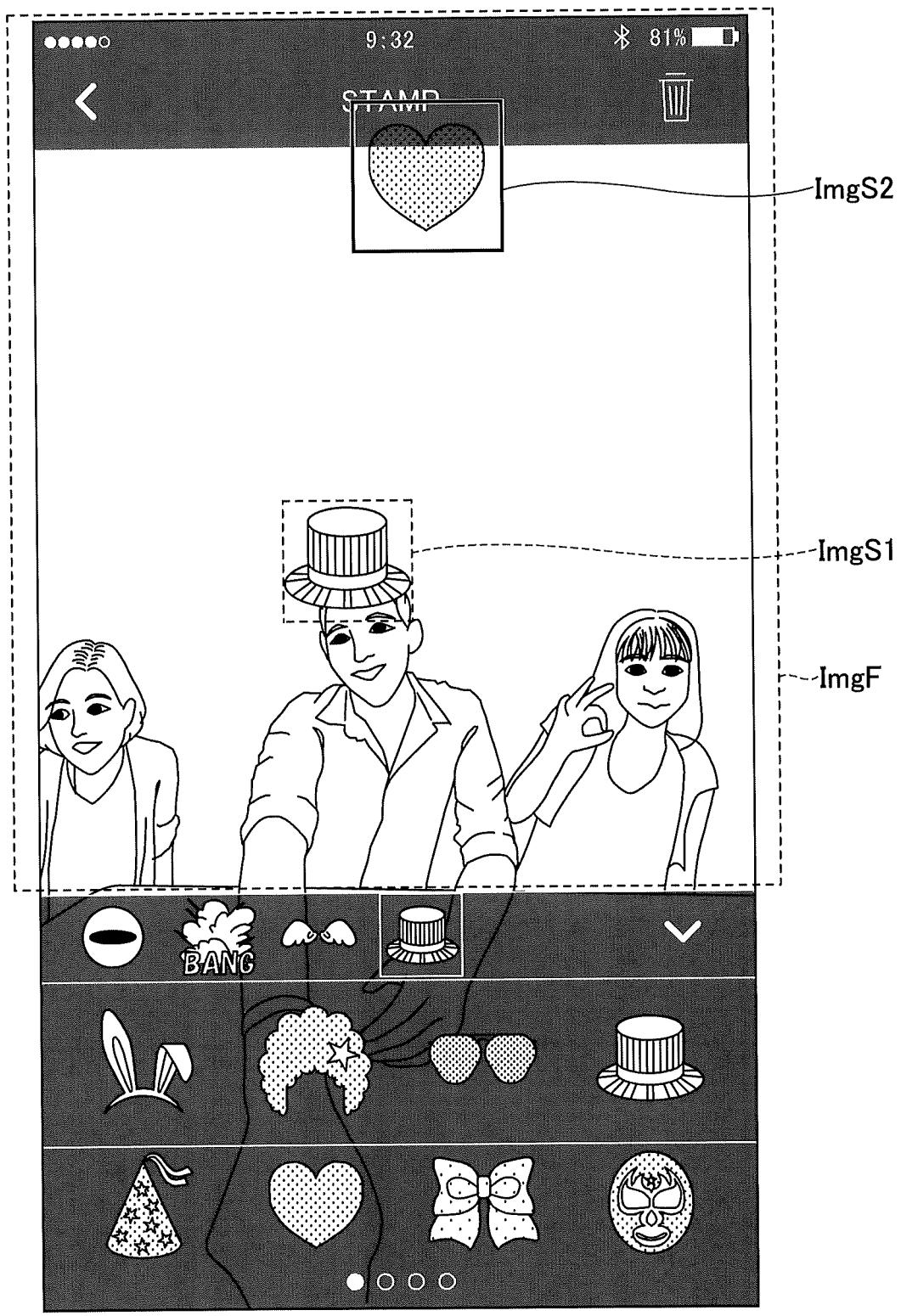
FIG. 30 is a diagram (version 3) illustrating the example of the screen in which stamps are placed according to an embodiment of the present disclosure.

FIG. 30 is a diagram (version 3) illustrating an example of a screen in which a stamp is arranged according to the embodiment of the present disclosure. In the depicted example, the second stamp image ImgS2 has already been selected, so that the first stamp image ImgS1 is determined. As a result, editing, such as changing the position of the first stamp image ImgS1, is restricted. However, the position of the second stamp image ImgS2 can be changed because the second stamp image ImgS2 is not yet determined. As a result, it is possible to change the position of the second stamp image ImgS2, for example, from the position of the second stamp image ImgS2 illustrated in FIG. 29 to the position illustrated in FIG. 30. As described above, the second image that is to be changed, namely, the second image in a state prior to determination, may preferably be one by one. Note that, the above-described example is an example in which the second image to be changed is indicated by a white frame, as depicted. With this configuration, the user can easily perform an operation related to the second image. Namely, by causing the second image to be selected one by one, the smartphone can enhance usability for the user. Note that, even after the determination, the change to delete the second image may be allowed.

Note that editing is not limited to changing the position of the second image. For example, editing may be an operation of configuring the type, the size, the position, the angle of the second image, or a combination thereof. Specifically, for example, when the size of the second image is changed, the output becomes as follows.

Figure 31:
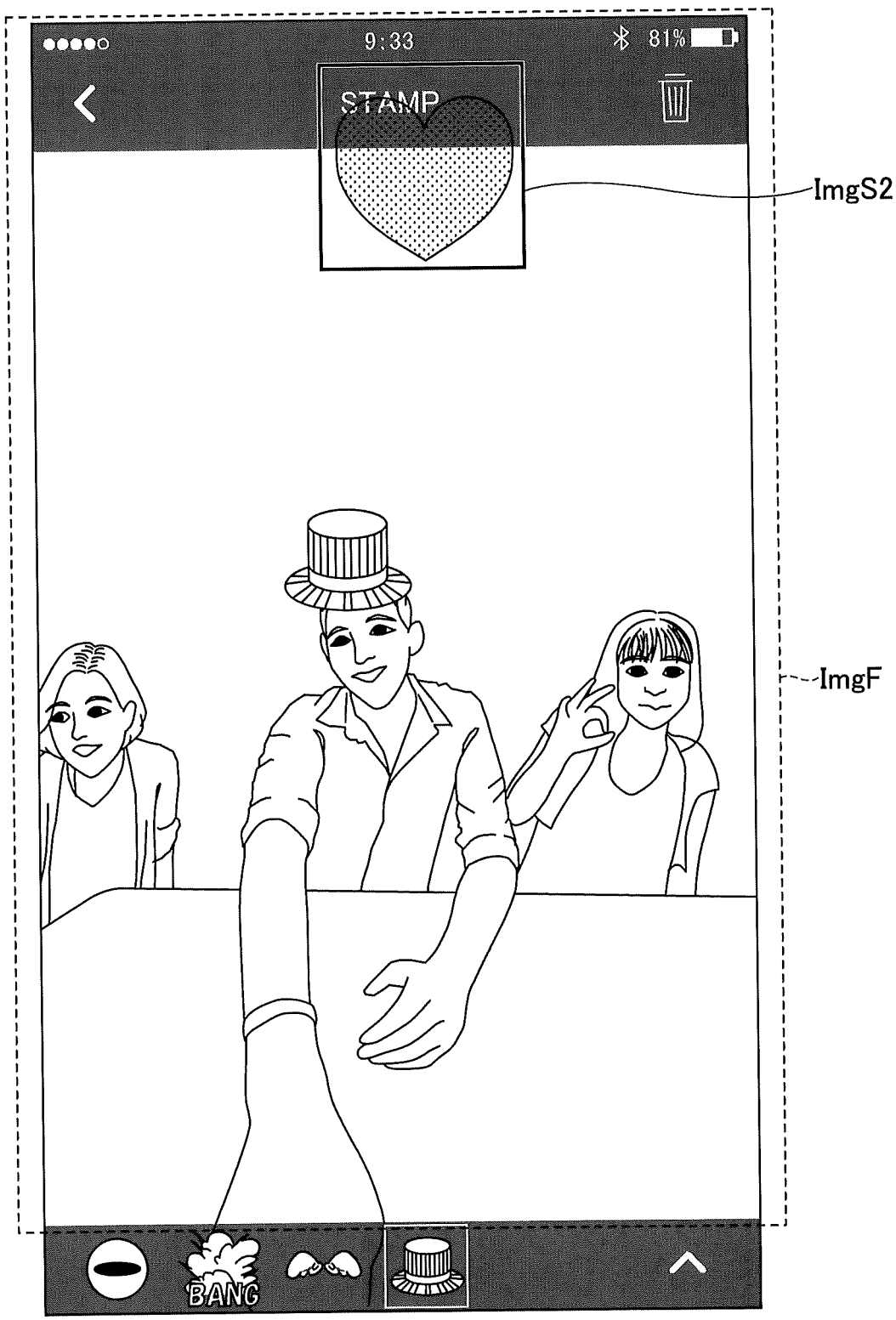
FIG. 31 is a diagram illustrating an example of a case in which a size of the stamp is modified according to an embodiment of the present disclosure.

FIG. 31 is a diagram illustrating an example in which the size of the stamp is changed according to the embodiment of the present disclosure. Compared to FIG. 30, the second stamp image ImgS2 illustrated in FIG. 31 differs in size. Specifically, the second stamp image ImgS2 illustrated in FIG. 31 is an example in which the size is enlarged, so that the second stamp image ImgS2 is displayed to be greater than the second stamp image ImgS2 illustrated in FIG. 30. Here, the change of the size may be reduction of the size. Additionally, upon detecting that the operation to change the angle of the second image is performed, the output may be as follows.

Figure 32:
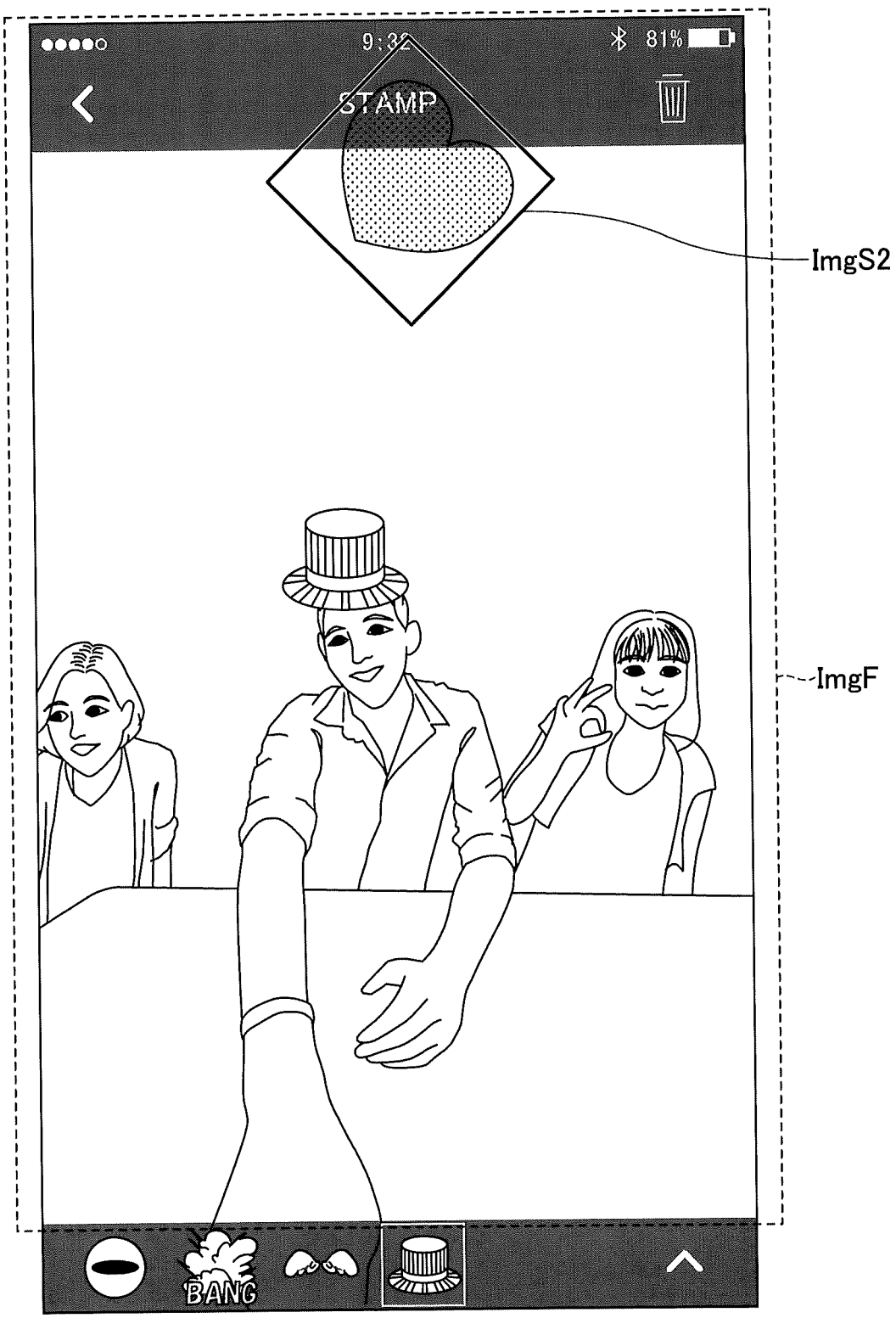
FIG. 32 is a diagram illustrating an example of a case in which an angle of the stamp is modified according to an embodiment of the present disclosure.

FIG. 32 is a diagram illustrating an example in which an angle of a stamp is changed according to the embodiment of the present disclosure. Compared to FIG. 31, the second stamp image ImgS2 illustrated in FIG. 32 differs in the angle. Specifically, the second stamp image ImgS2 illustrated in FIG. 32 is an example of a case in which the angle of the second stamp image ImgS2 illustrated in FIG. 31 is changed to rotate clockwise.

Note that the second image is not limited to the stamp. For example, the second image may include the following text.

Figure 33:
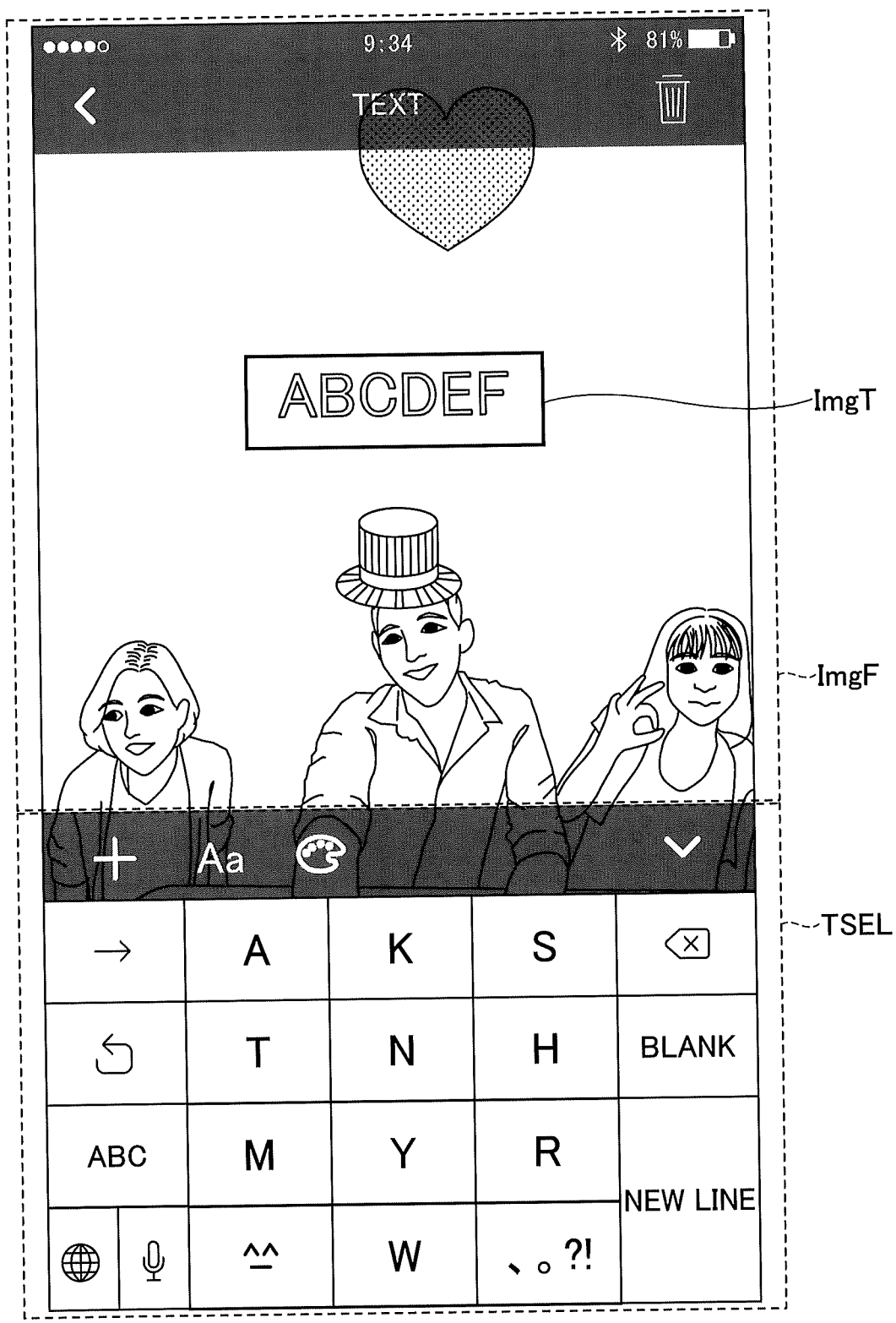
FIG. 33 is a diagram illustrating an example of a text screen according to an embodiment of the present disclosure.

FIG. 33 is a diagram illustrating an example of a text screen according to the embodiment of the present disclosure. For example, the second image may be an image representing the depicted text (which is referred to as the text image ImgT, hereinafter). Here, text, a symbol, a figure, a number, or a combination thereof (which is referred to as the text, etc., hereinafter) to be displayed in the text image ImgT is selected, for example, by a user's operation from a text selection menu TESL. Further, a decoration may be applied to the text, etc., such as bold, italic, color, selection of a font, a change in the size of the text, etc. Similar to the stamp, editing may be performed on the text image ImgT. For example, editing may be performed such that the position of the text image ImgT is changed as described below.

After the above-described editing is performed, in response to the selection of the next second image, the previously selected second image is determined. Specifically, the determined second image is as follows.

Figure 34:
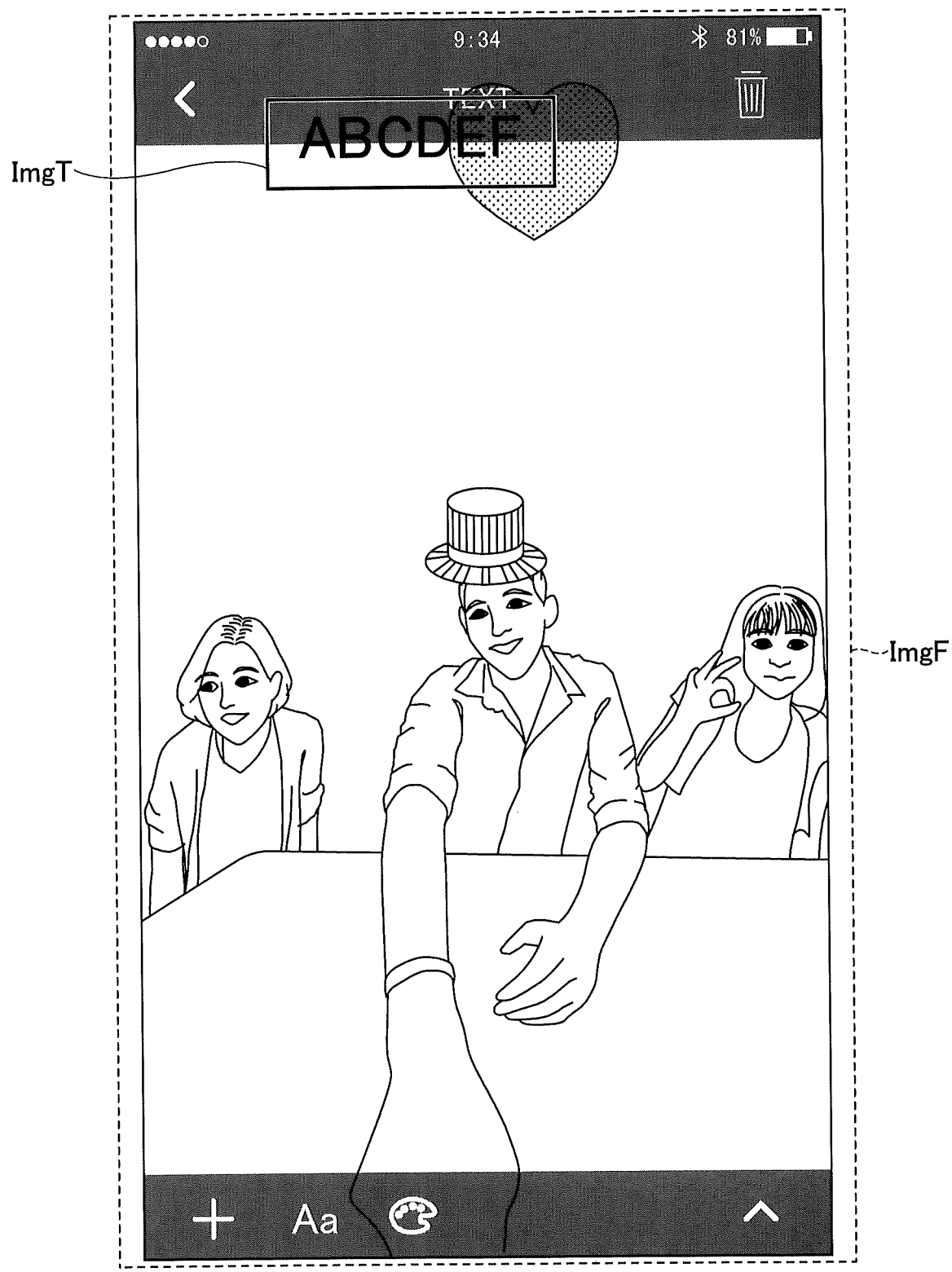
FIG. 34 is a diagram illustrating an example of a screen in which a text is placed.

FIG. 34 is a diagram illustrating an example of a screen in which text is arranged according to the embodiment of the present disclosure. FIG. 34 illustrates an example prior to the determination. Specifically, compared to FIG. 33, FIG. 34 differs in the position of the text image ImgT. Namely, similar to FIG. 30, FIG. 34 illustrates an example of a case in which an operation to change the position of the text image ImgT is input. Further, as depicted, editing may be performed to change the color of the text, etc., indicated by the text image ImgT to black. Then, when the next stamp is selected or an operation to terminate is input, the smartphone determines the text image ImgT, and, for example, outputs the following screen.

Figure 35:
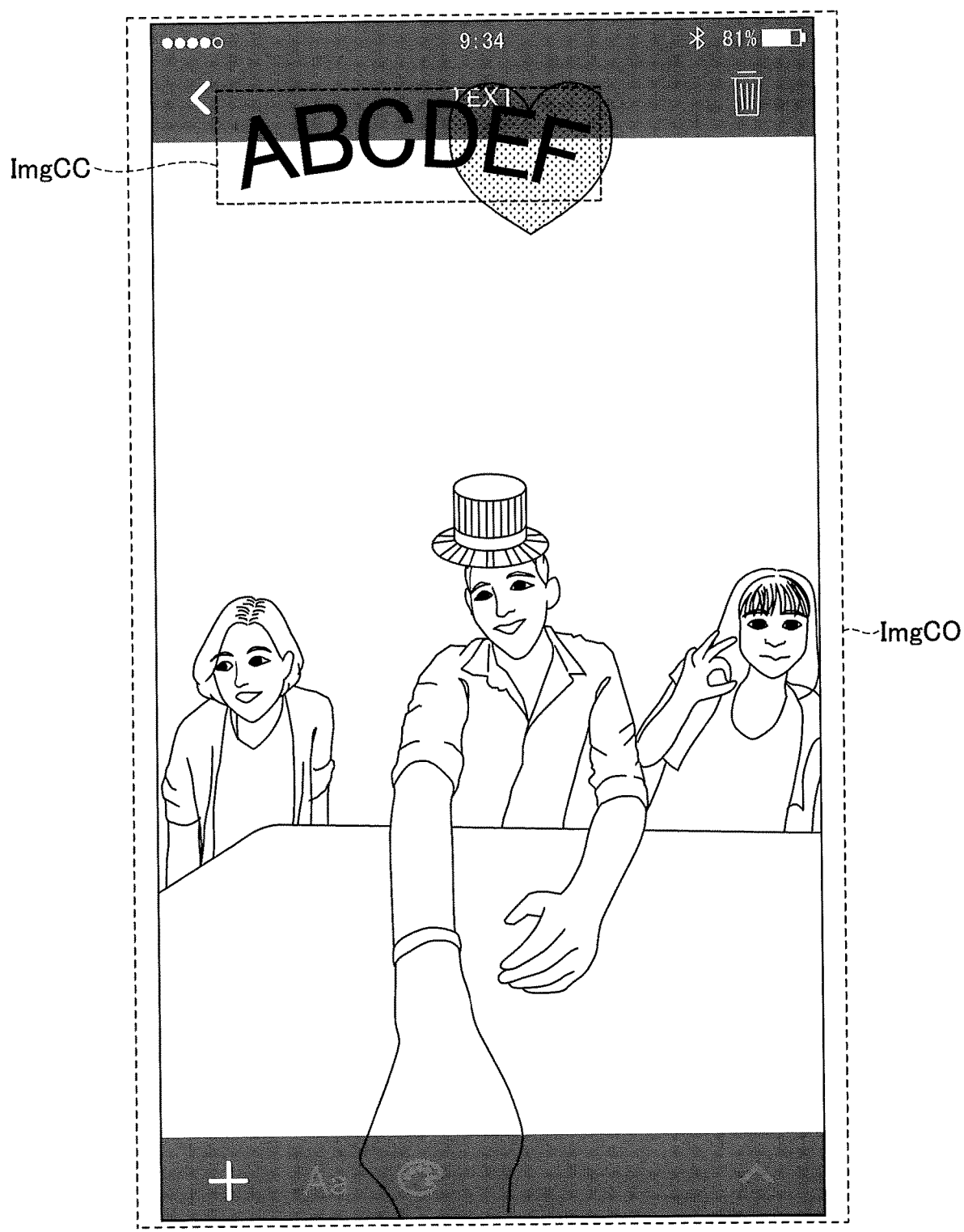
FIG. 35 is a diagram illustrating an example of a screen indicating a synthesized image according to an embodiment of the present disclosure.

FIG. 35 is a diagram illustrating an example of a screen indicating the synthesized image according to the embodiment of the present disclosure. For example, an example is indicated in which the text image ImgT illustrated in FIG. 34 is determined. In this example, compared to FIG. 34, a converted image ImgCC is generated, in response to the determination of the text image ImgT, as illustrated in FIG. 35. Note that, when the stamp image is determined, conversion is similarly performed by the smartphone.

Here, the converted image ImgCC is converted, for example, to reflect the curvature of the initial image. Namely, the initial image is the three-dimensional sphere CS illustrated in FIG. 15. Accordingly, there is a curvature. The smartphone determines the curvature of the first image based on the position at which the second image is arranged, and the smartphone generates the converted image ImgCC by converting the second image to reflect the identified curvature in the second image. If the converted image is converted in this manner, even if the converted image ImgCC is added to the first image, there is less awkwardness.

Suppose that the user performs the operation to newly add the second image to the captured first image, and that the added second image is determined. Subsequently, the smartphone generates the converted image ImgCC by converting the second image to be adjusted to the curvature of the first image. In this manner, the smartphone converts the image to be added in accordance with the captured image. Further, the synthesized image ImgCO is generated by synthesizing the first image and the converted image ImgCC. Specifically, in order to add the second image, namely, in order to generate the synthesized image ImgCO, the smartphone performs the following process.

Figure 36:
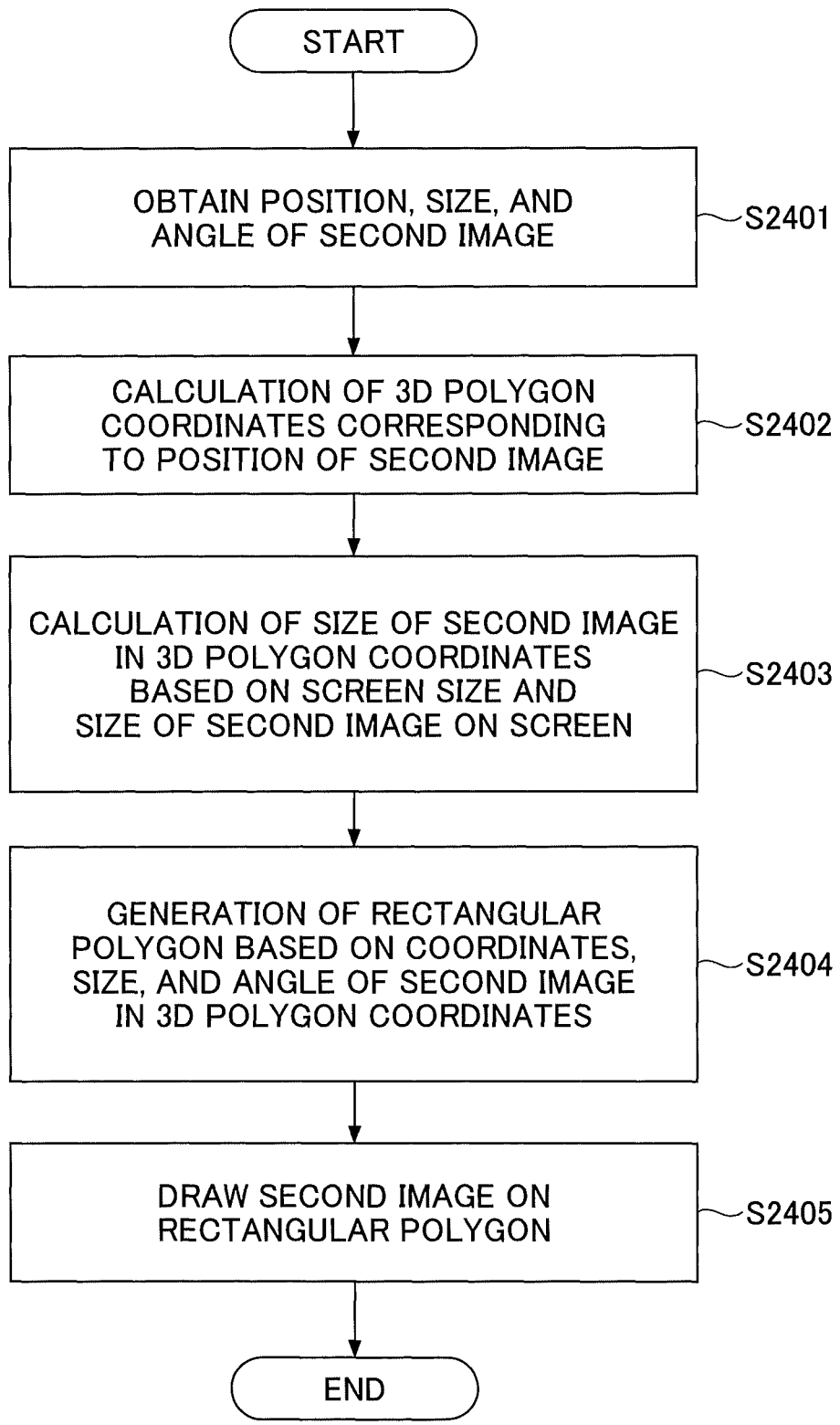
FIG. 36 is a flowchart illustrating an example of a process by the smartphone according to an embodiment of the present disclosure.

FIG. 36 is a flowchart illustrating an example of the process by the smartphone according to the embodiment of the present disclosure. Note that the depicted process corresponds to step S0708 and step S0709 in FIG. 9. In the following description, the three-dimensional coordinates ($r$, $\theta$, $\varphi$) on the three-dimensional sphere CS (FIG. 15) are referred to as 3D polygon coordinates.

At step S2401, the smartphone obtains the position, the size, and the angle of the second image. First, at step S2401 and at step S0708 of FIG. 9, the smartphone outputs the images illustrated in FIG. 26 through FIG. 35, and the smartphone inputs the user's operation. Upon detecting that the second image is determined, at step S2401, the smartphone obtains the position, the size, and the angle of the second image. For example, the position is indicated by the coordinates (x, y) in the screen. The size is the vertical pixel numbers and the horizontal pixel numbers of the second image. Here, the size may be a magnification with reference to a certain size. The angle is the angle of the second image with respect to the horizontal direction (x-axis) on the screen.

At step S2402, the smartphone calculates the 3D polygon coordinates corresponding to the position of the second image. Namely, the smartphone calculates the three-dimensional coordinates ($r$, $\theta$, $\varphi$) on the three-dimensional sphere (FIG. 15) corresponding to the coordinates (x, y), which are the coordinates on the screen. The smartphone calculates at which position on the 3D object, which is used for displaying a 360° image, such as the 3D spherical polygon, namely, the three-dimensional sphere CS, the coordinates (x, y) on the screen are to be projected.

At step S2403, the smartphone calculates the size of the second image on the 3D polygon coordinates based on the screen size and the size of the second image on the screen. Namely, at step S2403, the smartphone calculates the size of the second image on the three-dimensional coordinates ($r$, $\theta$, $\varphi$). This calculation is performed based on the size of the second image on the coordinates (x, y) on the screen obtained at step S2401.

At step S2404, the smartphone generates a rectangular polygon based on the coordinates, the size, and the angle of the second image on the 3D polygon coordinates. Note that the rectangular polygon is a rectangular 3D object generated to add the converted image to the first image. For example, the rectangular polygon is generated by OpenGL (registered trademark).

At step S2405, the smartphone draws the second image on the rectangular polygon generated at step S2404. The drawing is implemented by OpenGL (registered trademark), for example. In this manner, the smartphone can generate the converted image.

By executing the above-described process, the following processing results are obtained.

Figure 37:
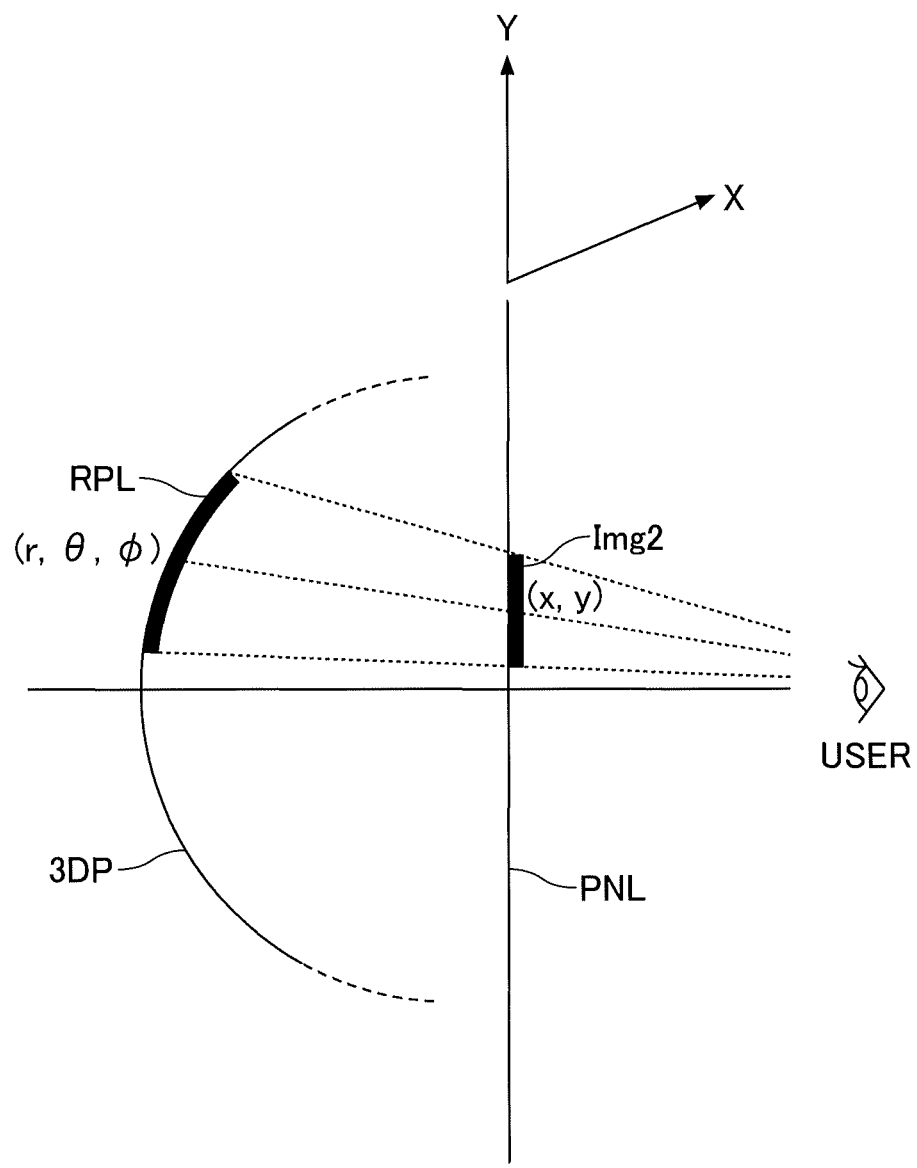
FIG. 37 is a diagram illustrating an example of a process of adding a second image by the smartphone according to an embodiment of the present disclosure.

FIG. 37 is a diagram illustrating an example of the process of adding the second image by the smartphone according to the embodiment of the present disclosure. The figure is a conceptual figure illustrating the processing result of FIG. 36. In this example, it is assumed that the center position of the second image Img2 on the screen PNL of the smartphone 2 (FIG. 1) is indicated by the coordinates (x, y). First, the position, the size, and the angle of the second image Img2 are obtained by the smartphone 2 at step S2401 (FIG. 36).

Next, at step S2402 (FIG. 36), the smartphone 2 calculates the three-dimensional coordinates (r, θ, φ) on the 3D spherical polygon 3DP. Namely, as depicted, the smartphone 2 calculates the position on the 3D spherical polygon 3DP at which the coordinates (x, y) are located from the viewpoint of the user. Then, in order to add the second image Img2 at the position calculated at step S2402, the smartphone generates the rectangular polygon RPL.

First, the smartphone 2 calculates the size of the rectangular polygon RPL at step S2403 (FIG. 36). Then, at step S2404 (FIG. 36), the smartphone 2 generates the rectangular polygon RPL so that the rectangular polygon RPL has the calculated size. Subsequently, at step S2405 (FIG. 346), the second image Img2 is drawn on the rectangular polygon RPL. In this manner, the smartphone 2 can generate the converted image with a curvature that matches the first image, as illustrated in FIG. 35.

Note that, when the second image is selected, the first image may preferably be fixed. Namely, in many cases, the first image can be enlarged, reduced, or the displayed part can be changed. Even in such a case, when the second image is selected, the first image may preferably indicate the constant size and the same part. When the first image is changed while the second image is edited, it is often difficult for the user to operate. Thus, when the selection of the second image has already been made, the smartphone fixes the first image so that the display of the first image is not changed. In this manner, the smartphone can enhance the user operability.

The smartphone may preferably restrict the range in which the user can specify the position of the second image. As illustrated in FIG. 36, the smartphone calculates the three-dimensional coordinates (r, θ, φ) on the 3D spherical polygon. Accordingly, when the second image is placed at a position at which calculation of the three-dimensional coordinates (r, θ, φ) is difficult, it becomes difficult for the smartphone to perform step S2402 (FIG. 36), etc. Note that, the position at which the calculation of the three-dimensional coordinates (r, θ, φ) is difficult is, for example, a position at which the hemisphere image does not have a pixel. Specifically, it is a position such as that described below.

Figure 38:
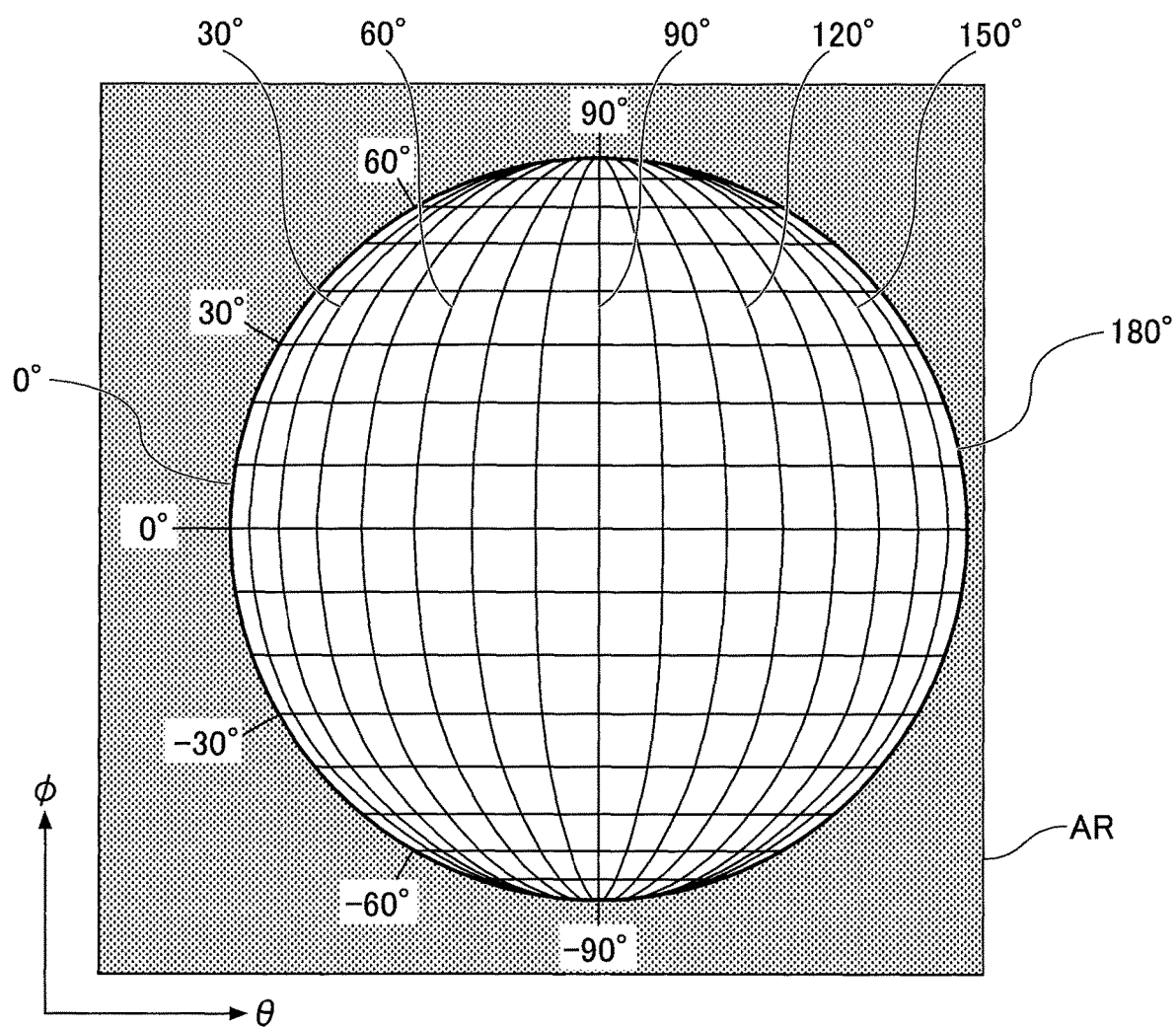
FIG. 38 is a diagram illustrating an example a range in which placement of the second image is restricted by the smartphone according to an embodiment of the present disclosure.

FIG. 38 is a diagram illustrating an example of a range in which the smartphone restricts the second image to be arranged according to the embodiment of the present disclosure. For example, the hemisphere image illustrated in (a) of FIG. 6 is described as an example. In this example, the range in which the second image is restricted from being arranged (which is referred to as the restricted range AR, hereinafter) is the depicted range. For example, the smartphone may restrict the first image to be displayed on the screen for selecting the second image so that the restricted range AR is not output on the screen. In this manner, the smartphone may restrict the range in which the user can specify the position of the second image so that the second image can be easily overlapped on the first image.

Furthermore, the smartphone may more preferably restrict displaying the vicinity of a position that is a pole, such as φ=90° and φ=−90° in FIG. 38, in the screen for selecting the second image. When a pole is displayed, an image not intended by the user may be displayed. Accordingly, the smartphone may preferably prevent the position that is the pole from being output on the screen. Here, the smartphone may restrict the second image from being arranged at the position close to the pole. As described above, the smartphone may restrict the operation to select the second image in the height direction, i.e., the φ direction.

Example of Functional Configuration

Figure 39:
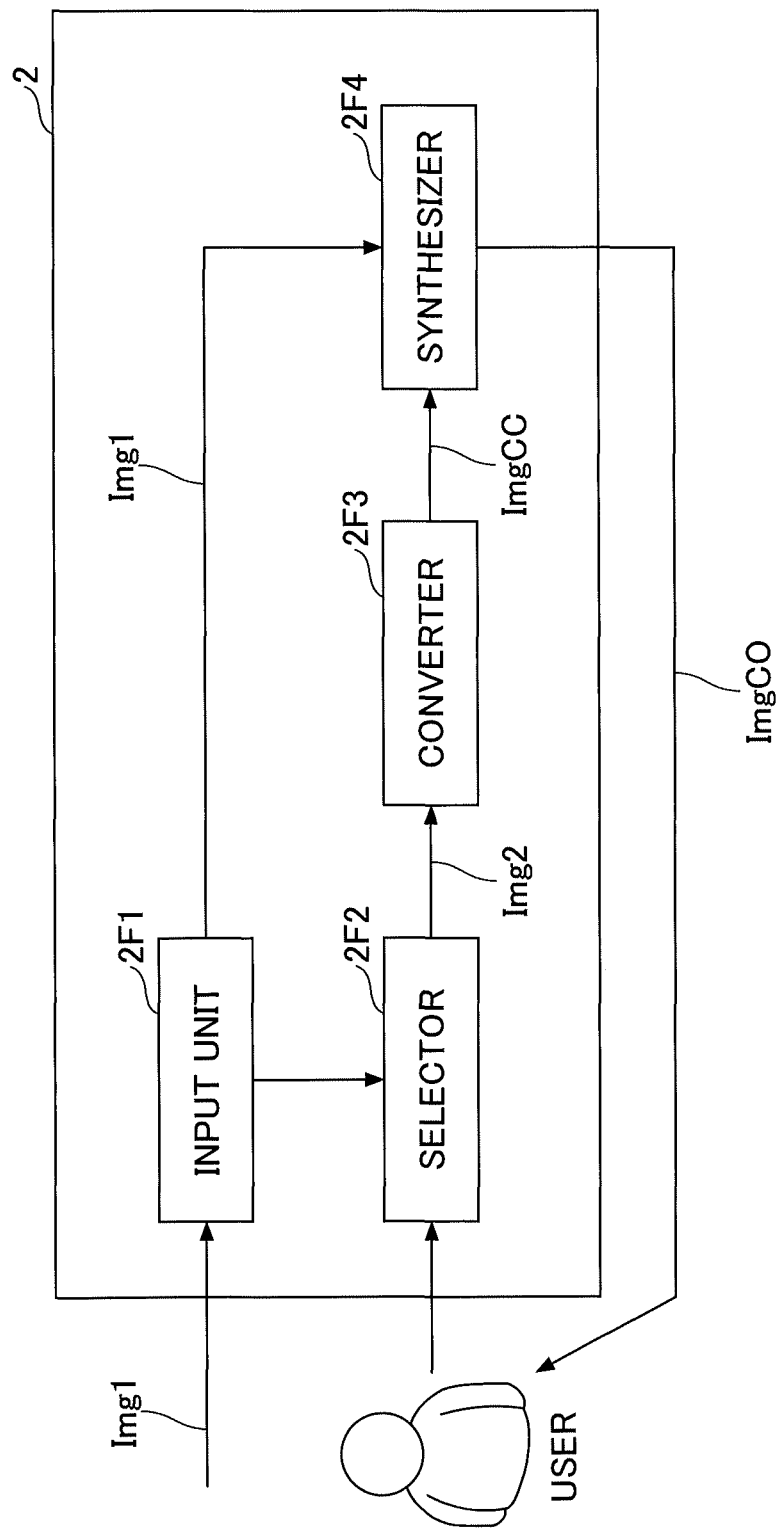
FIG. 39 is a functional block diagram illustrating an example of a functional configuration of the image processing device according to an embodiment of the present disclosure.

FIG. 39 is a functional block diagram illustrating an example of a functional configuration of the image processing device according to the embodiment of the present disclosure. As depicted, the smartphone 2 that is the example of the image processing device includes an input unit 2F1; a selector 2F2; a converter 2F3; and a synthesizer 2F4.

The input unit 2F1 inputs the first image Img1. For example, when the celestial panoramic image is input as the first image Img1, the input unit 2F1 is implemented by the image capturing device 1 (FIG. 7) and the network I/F 2H6 (FIG. 8).

The selector 2F2 selects the second image Img2, such as the stamp to be added to the first image Img1. Additionally, the selector 2F2 may receive the user's operation, such as that of editing on the second image Img2. For example, the selector 2F2 may be implemented by the input/output device 2H3 (FIG. 8).

The converter 2F3 converts the second image Img2 selected by the selector 2F2 based on the first image Img1 input by the input unit 2F1 to generate the converted image ImgCC. For example, the converter 2F3 converts the second image Img2 as illustrated in FIG. 36 and FIG. 37 to generate the converted image ImgCC. The converter 2F3 is implemented, for example, by the CPU 2H5 (FIG. 8).

The synthesizer 2F4 synthesizes the first image Img1 input by the input unit 2F1 and the converted image ImgCC converted from the second image Img2 by the converter 2F3 to generate the synthesized image ImgCO. For example, the synthesizer 2F4 is implemented by the CPU 2H5.

First, the smartphone 2 inputs, by the input unit 2F1, the first image Img1. Then, by the user's operation, the second image Img2, such as the stamp or the text, is added to the first image Img1. The second image Img2 is selected by the selector 2F2. Next, the smartphone 2 converts the second image Img2 to be adjusted to the first image Img1 to generate the converted image ImgCC.

The first image Img1 may be a celestial sphere image. Accordingly, the image may be an image captured by an optical system, such as a wide-angle lens or a fish-eye lens. Such a first image Img1 may often have a curvature, due to the distortion aberration, etc. In contrast, the second image Img2 may often have a small curvature because the second image Img2 may be a stamp, etc. Accordingly, when the second image Img2 is simply added to the first image Img1, the two images may be discontinuous or the connection is unnatural in many cases because the first image Img1 and the second image Img2 have different curvatures. Namely, when the second image Img2 is simply added to the first image Img1 without conversion, an awkward image may be obtained in many cases.

In contrast, the conversion image ImgCC generated by conversion by the converter 2F3 based on the first image Img1 has a curvature close to that of the first image Img1 by the conversion. Accordingly, when the first image Img1 and the converted image ImgCC are synthesized by the synthesizer 2F4, the synthesized image ImgCO becomes a less awkward image. As described above, the image processing device can generate a less awkward image, even if an image is newly added to a captured image.

The embodiment according to the present disclosure may be implemented by a program described in a programming language. Namely, the embodiment according to the present disclosure may be implemented by a program for causing a computer, such as the image processing device, to execute the image processing method. Note that the program may be distributed by storing the program in a recording medium, such as a flash memory, an SD (registered trademark) card, or an optical disk. Alternatively, the program may be distributed through an electric communication line, such as the Internet.

Note that the image according to the embodiment of the present disclosure is not limited to a still image. For example, the image may be a video.

In the embodiment of the present disclosure, some or the entire the processing may be processed and implemented in a programmable device (PD), such as a field programmable gate array (FPGA). Furthermore, in the embodiment according to the present disclosure, some or the entire processing may be processed and implemented in an ASIC (Application Specific Integrated Circuit).

The preferred embodiment of the present invention is described in detail above. However, the present invention is not limited to the specific embodiment. Namely, various modifications and alterations may be made within the scope of the gist of the present invention described in the claims.

The invention claimed is:

1. An image processing device comprising:
a processor; and
a memory that includes instructions, which when executed, cause the processor to executing the following steps:
displaying a screen for editing;
inputting a first image;
displaying the first image on the screen;
selecting a second image to be added to the first image;
specifying a position on the first image displayed on the screen at which the second image is displayed;
generating a converted image by converting the second image based on the first image; and
generating a synthesized image by superposing the converted image onto the first image,
wherein the first image is an image corresponding to a first area of a three-dimensional sphere and the first image has a curvature corresponding to the first area of the three-dimensional sphere,
wherein the second image is an image corresponding to an area of a cross-section of the three-dimensional sphere, the cross-section including a center point of the three-dimensional sphere, and
wherein the converting converts the second image so that the curvature of the position on the first image at which the second image is displayed is reflected, by drawing the second image on a second area of the three-dimensional sphere, the second area being formed by projecting the second image onto the first area of the three-dimensional sphere.

2. The image processing device according to claim 1, wherein the first image is an image generated based on an image captured by an image capturing device or a plurality of images captured by a plurality of image capturing devices.

3. The image processing device according to claim 1, wherein the selecting inputs an operation to edit a type, a size, a position, an angle of the second image, or a combination thereof.

4. The image processing device according to claim 1, wherein the selecting the second image includes selecting a previous second image and, subsequently, selecting a new second image, and
wherein the steps executed by the processor further include, upon detecting that the new second image is selected, finalizing the selection of the previous second image.

5. The image processing device according to claim 1, wherein the specifying is disallowed to specify a position at which no pixel of a celestial sphere image exists, as the position on the first image at which the second image is displayed.

6. The image processing device according to claim 1, wherein the selecting prevents displaying, on the screen, an area of the first image in which no pixel of a celestial sphere image exists.

7. The image processing device according to claim 6, wherein the selecting prevents displaying, on the screen, a part of the first image corresponding to a pole.

8. The image processing device according to claim 1, wherein the selecting fixes a position at which the first image is displayed.

9. An image processing system comprising:
an image capturing device; and
one or more information processing devices connected to the image capturing device,
wherein the image processing system includes
a processor; and
a memory that includes instructions, which when executed, cause the processor to executing the following steps:
displaying a screen for editing,
inputting a first image,
displaying the first image on the screen,
selecting a second image to be added to the first image,
specifying a position on the first image displayed on the screen at which the second image is displayed,
generating a converted image by converting the second image based on the first image, and
generating a synthesized image by superposing the converted image onto the first image,
wherein the first image is an image corresponding to a first area of a three-dimensional sphere and the first image has a curvature corresponding to the first area of the three-dimensional sphere,
wherein the second image is an image corresponding to an area of a cross-section of the three-dimensional sphere, the cross-section including a center point of the three-dimensional sphere, and
wherein the converting converts the second image so that the curvature of the position on the first image at which the second image is displayed is reflected, by drawing the second image on a second area of the three-dimensional sphere, the second area being formed by projecting the second image onto the first area of the three-dimensional sphere.

10. A non-transitory storage medium for storing a program for causing a computer to execute an image processing method, wherein the image processing method comprising:

displaying, by the computer, a screen for editing;

inputting, by the computer, a first image;

displaying, by the computer, the first image on the screen;

selecting, by the computer, a second image to be added to the first image;

specifying, by the computer, a position on the first image displayed on the screen at which the second image is displayed;

generating, by the computer, a converted image by converting the second image based on the first image; and generating, by the computer, a synthesized image by superposing the converted image onto the first image, wherein the first image is an image corresponding to a first area of a three-dimensional sphere and the first image has a curvature corresponding to the first area of the three-dimensional sphere, wherein the second image is an image corresponding to an area of a cross-section of the three-dimensional sphere, the cross-section including a center point of the three-dimensional sphere, and wherein the converting converts the second image so that the curvature of the position on the first image at which the second image is displayed is reflected, by drawing the second image on a second area of the three-dimensional sphere, the second area being formed by projecting the second image onto the first area of the three-dimensional sphere.

\* \* \* \* \*